(12) United States Patent
Gray et al.

(10) Patent No.: US 10,361,848 B2
(45) Date of Patent: *Jul. 23, 2019

(54) SYSTEMS AND METHODS FOR QUANTUM KEY GENERATION

(71) Applicant: Corning Incorporated, Corning, NY (US)

(72) Inventors: Stuart Gray, Corning, NY (US); Ming-Jun Li, Horseheads, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 193 days.

This patent is subject to a terminal disclaimer.

(21) Appl. No.: 15/438,155

(22) Filed: Feb. 21, 2017

(65) Prior Publication Data

US 2017/0163415 A1 Jun. 8, 2017

Related U.S. Application Data

(63) Continuation of application No. PCT/US2016/024854, filed on Mar. 30, 2016, and a
(Continued)

(51) Int. Cl.
*H04W 12/04* (2009.01)
*H04L 9/08* (2006.01)
(Continued)

(52) U.S. Cl.
CPC .......... *H04L 9/0861* (2013.01); *H04L 9/0855* (2013.01); *H04L 63/0435* (2013.01); *H04W 12/04* (2013.01); *H04B 10/2504* (2013.01)

(58) Field of Classification Search
CPC . H04L 9/0861; H04L 9/0855; H04L 63/0435; H04W 12/04; H04B 10/2504
(Continued)

(56) References Cited

U.S. PATENT DOCUMENTS 6,986,056 B1 1/2006 Dultz et al.
7,492,900 B2 2/2009 Yuan et al.
(Continued)

FOREIGN PATENT DOCUMENTS

CN 103929251 A 7/2014
JP 2008154051 A 7/2008

OTHER PUBLICATIONS

Nilsson et al.; "Solid state quantum memory using complete absorption and re-emission of photons by tailored and externally controlled inhomogeneous absorption profiles"; Optical Communications 247 (2005); pp. 393-403.
(Continued)

*Primary Examiner* — Khoi V Le
(74) *Attorney, Agent, or Firm* — Svetlana Z. Short

(57) ABSTRACT

A quantum key generation system including two photon detector units, two photon entanglement chains extending between the two photon detector units, and a plurality of multicore fiber links each including at least two non-uniform cores structurally configured to provide non-uniform photon propagation delay. Each photon entanglement chain includes at least one quantum repeater structurally configured to entangle a pair of photons and first and second terminating quantum memories optically coupled the quantum repeater using the multicore fiber links such that photons received by the first and the second terminating quantum memories are entangled with photons entangled by the quantum repeater. The first and second terminating quantum memories of each of the two photon entanglement chains form first and second cross-chain quantum repeaters, and the first and the second photon detector units are structurally configured to receive the measurable entangled particles generated by the first and second cross-chain quantum repeaters, respectively.

20 Claims, 7 Drawing Sheets

Related U.S. Application Data continuation-in-part of application No. 14/680,522, filed on Apr. 7, 2015, now Pat. No. 9,313,180, said application No. PCT/US2016/024854 is a continuation of application No. 14/680,522, filed on Apr. 7, 2015, now Pat. No. 9,313,180.

(60) Provisional application No. 62/197,920, filed on Jul. 28, 2015, provisional application No. 62/140,787, filed on Mar. 31, 3015.

(51) Int. Cl.
*H04L 29/06* (2006.01)
*H04B 10/25* (2013.01)

(58) Field of Classification Search
USPC .......................................................... 380/44
See application file for complete search history.

(56) References Cited

U.S. PATENT DOCUMENTS

| | | | |
|---|---|---|---|
| 7,492,903 B2 | 2/2009 | Ichimura et al. | |
| 7,773,294 B2 | 8/2010 | Brunet et al. | |
| 7,783,042 B2 | 8/2010 | Maeda et al. | |
| 7,907,850 B2 | 3/2011 | Tanaka et al. | |
| 8,135,276 B2 | 3/2012 | Munro et al. | |
| 8,903,094 B2 | 12/2014 | Bovino | |
| 9,219,605 B2 | 12/2015 | Niskanen et al. | |
| 9,264,226 B2 | 2/2016 | Harrison et al. | |
| 2006/0045527 A1 | 3/2006 | Maeda et al. | |
| 2010/0293380 A1* | 11/2010 | Wiseman | H04L 9/0855 713/169 |
| 2010/0299526 A1* | 11/2010 | Wiseman | H04L 9/0855 713/171 |
| 2011/0129190 A1 | 6/2011 | Fini et al. | |
| 2013/0251145 A1* | 9/2013 | Lowans | H04L 9/0838 380/44 |
| 2013/0308913 A1 | 11/2013 | Tanigawa et al. | |
| 2014/0099104 A1* | 4/2014 | Peters | H04B 10/70 398/25 |
| 2014/0233739 A1* | 8/2014 | Grice | H04L 9/0855 380/278 |
| 2014/0363174 A1* | 12/2014 | Azuma | H04B 10/70 398/173 |
| 2015/0078744 A1 | 3/2015 | Ito et al. | |
| 2016/0105439 A1* | 4/2016 | Hunt | H04B 10/70 726/4 |

OTHER PUBLICATIONS

Sangouard et al.; "Quantum repeaters based on atomic ensembles and linear optics"; Review of Modern Physics, vol. 83 (Jan.-Mar. 2011); pp. 33-80.

Agarwal; Quantum Optics; Cambridge University Press, copyright 2013; pp. 108-109.

Duan et al.; "Long-distance quantum communication with atomic ensembles and linear optics"; Nature, vol. 414 (Nov. 22, 2001); pp. 413-418.

Lauritzen et al.; "Approaches for a quantum memory at telecommunication wavelengths"; Physical Review A 83 (2011); pp. 012318-1-012318-12.

Lauritzen et al.; "State preparation by optical pumping in erbium-doped solids using stimulated emission and spin mixing"; Physical Review A 78 (2008); pp. 043402-1-043402-9.

Saglamyurek et al.; "Quantum storage of entangled telecom-wavelength photons in an erbium-doped optical fibre"; Nature Photonics, vol. 9 (Feb. 2015); pp. 83-87.

Saglamyurek et al.; "Quantum storage of entangled telecom-wavelength photons in an erbium-doped optical fibre"; Supplementary Information; Nature Photonics, (2015); www.nature.com/naturephotonics; pp. 1-6.

Thiel et al.; "Rare-earth-doped materials for applications in quantum information storage and signal processing"; Journal of Luminescence 131 (2011); pp. 353-361.

Aeysha Khalique et al. "Practical long-distance quantum key distribution through concatenated entanglement swapping with parametric down-conversion sources" Arxiv.org Cornell University Library (2015) 9 pgs.

Amirloo et al. "Quantum key distribution over probabilistic quantum repeaters" Arxiv.org Cornell University Library (2010) 12 pgs.

Eraerds et al., "Quantum key distribution and 1 Gbps data encryption over a single fibre", New Journal of Physics 12 (2010) 9 pgs.

International Searching Authority Invitation to Pay Additional Search Fees PCT/US2016/024854 dated Jan. 19, 2017.

McMahon et al. "Towards quantum repeaters with solid-state qubits: spin photon entanglement generation using self-assembled quantum dots" Arxiv.org Cornell University Library (2015) 51 pgs.

Scherer et al. "Long distance practical quantum key distribution by entanglement swapping" Arxiv.org Cornell University Library (2010) 15 pgs.

English Translation of CN201680031505.1 First Office Action dated Jul. 3, 2018, China Patent Office.

International Search Report and Written Opinion PCT/US2016/024854 dated Mar. 16, 2017.

JP2017551220 Notice of Allowance dated May 29, 2019, Japan Patent Office, 2 Pgs.

* cited by examiner

SYSTEMS AND METHODS FOR QUANTUM KEY GENERATION

This application is a continuation of International Application No. PCT/US16/24854, filed on Mar. 30, 2016, which claims priority to U.S. application Ser. No. 14/680,522, filed on Apr. 7, 2015, U.S. Application No. 62/140,787, filed on Mar. 31, 2015, and U.S. Application No. 62/197,920, filed on Jul. 28, 2015. The present application is also a continuation-in-part of and claims the priority benefit of U.S. application Ser. No. 14/680,522, filed on Apr. 7, 2015, which issued on Apr. 12, 2016 as U.S. Pat. No. 9,313,180 and which claims the benefit of priority of U.S. Application No. 62/140,787, filed on Mar. 31, 2015, the contents of each of which are relied upon and incorporated by reference herein in their entireties.

BACKGROUND

The present disclosure relates to quantum key generation systems and methods of generating quantum keys. More specifically, the present disclosure relates to quantum key generation systems for providing increased quantum key bit rates.

BRIEF SUMMARY

According to the subject matter of the present disclosure, a quantum key generation system includes two photon detector units, two photon entanglement chains, and a plurality of multicore fiber links. Each photon entanglement chain extends between the two photon detector units. Each photon entanglement chain comprises at least one quantum repeater and first and second terminating quantum memories. The first and second terminating quantum memories are positioned at first and second ends of the photon entanglement chains, respectively. The quantum repeater of each photon entanglement chain is structurally configured to entangle a pair of photons. The plurality of multicore optical fiber links are structurally configured to optically couple the quantum repeater of each photon entanglement chain to the first and second terminating quantum memories of each photon entanglement chain such that photons received by the first and the second terminating quantum memories are entangled with photons entangled by the quantum repeater. The plurality of multicore optical fiber links each comprise at least two non-uniform cores structurally configured to provide non-uniform photon propagation delay. The first and second terminating quantum memories of each of the two photon entanglement chains form first and second cross-chain quantum repeaters, respectively, to generate measurable entangled particles at the cross-chain quantum repeaters. Additionally, the first and the second photon detector units are structurally configured to receive the measurable entangled particles generated by the first and second cross-chain quantum repeaters, respectively.

In accordance with one embodiment of the present disclosure, a quantum key generation system includes two photon entanglement chains, two photon detector units, and a plurality of multicore fiber links. Each photon entanglement chain extends between the two photon detector units. The plurality of multicore optical fiber links are structurally configured to optically couple a quantum repeater of each photon entanglement chain to first and second terminating quantum memories of each photon entanglement chain. Additionally, the two photon entanglement chains are structurally configured to generate correlative quantum key bits receivable by each photon detector unit at a bit rate of between about 1-100 MHz.

In accordance with another embodiment of the present disclosure, a quantum key generation system includes two photon entanglement chains, two photon detector units, and a plurality of multicore fiber links. Each photon entanglement chain extends between the two photon detector units. The plurality of multicore optical fiber links are structurally configured to optically couple a quantum repeater of each photon entanglement chain to first and second terminating quantum memories of each photon entanglement chain. Additionally, the two photon entanglement chains are structurally configured to generate correlative quantum key bits receivable by each photon detector unit at a bit rate $\Gamma$ that is within about 10% of a processing rate $\Pi$ of the at least one quantum repeater.

In accordance with yet another embodiment of the present disclosure, a quantum key generation system comprising two photon entanglement chains, two photon detector units, and a plurality of multicore fiber links. Each photon entanglement chain extends between the two photon detector units. The plurality of multicore optical fiber links are structurally configured to optically couple a quantum repeater of each photon entanglement chain to first and second terminating quantum memories of each photon entanglement chain. Additionally, the two photon entanglement chains are structurally configured to generate correlative quantum information receivable by each photon detector unit at a bit rate $\Gamma$ that is within about 10% of a processing rate $\Pi$ of the at least one quantum repeater.

Although the concepts of the present disclosure are described herein with primary reference to quantum key generation, it is contemplated that the concepts will enjoy applicability to any quantum information communication.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
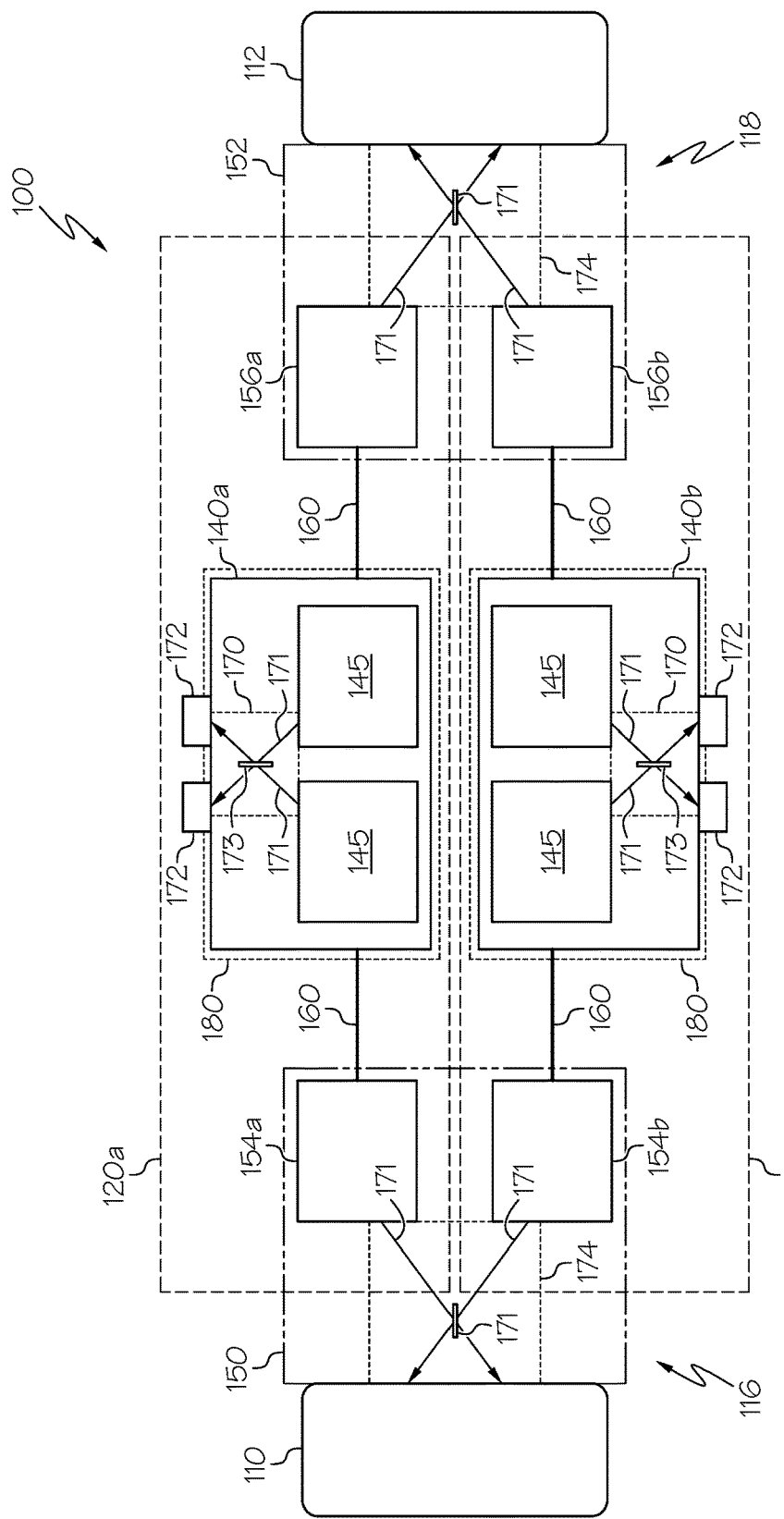
FIG. 1 schematically depicts a quantum key generation system including at least one quantum repeater according to one or more embodiments shown and described herein.

Referring initially to FIG. 1, a quantum key generation system 100 comprising two photon detector units 110, 112, two photon entanglement chains 120a, 120b, and a plurality of optical fiber links 160 is depicted. Each photon entanglement chain 120a, 120b extends between the two photon detector units 110, 112 and each photon entanglement chain 120a, 120b comprises at least one quantum repeater 140a, 140b and first and second terminating quantum memories 154a, 154b, 156a, 156b.

The quantum repeater 140a, 140b of each photon entanglement chain 120a, 120b may be structurally configured to entangle a pair of photons. For example, the at least one quantum repeater 140a, 140b may comprise two quantum memories 145 and entanglement optics 170. The entanglement optics 170 may include two or more entangling pathways 171 optically coupled to and extending between the two quantum memories 145 and two entanglement detectors 172. The entanglement detectors 172 may comprise single-photon detectors, e.g., superconducting nanowire single-photon detectors. The entanglement detectors 172 may also comprise low noise photodiodes. The entanglement optics 170 may further comprise a beamsplitter 173 positioned such that each entangling pathway 171 traverses the beamsplitter 173. The entanglement optics 170 may be structurally configured to entangle pairs of particles when particles output by the quantum memories 145 simultaneously traverse the beamsplitter 173. Further, the entanglement optics 170 may be housed within an optical waveguide, and in some embodiments, the at least one quantum repeater 140a, 140b, the entanglement optics 170, and the entanglement detectors 172 may form a photonic integrated circuit. In alternative embodiments, the quantum repeaters 140a, 140b may comprise entanglement optics 170 without quantum memories 145, for example, entanglement optics 170 structurally configured to entangle pair of particles, such as photons, received by the quantum repeaters 140a, 140b.

Referring still to FIG. 1, the first and second terminating quantum memories 154a, 154b, 156a, 156b may be positioned at first and second ends 116, 118 of the photon entanglement chains 120a, 120b, respectively. The first and second terminating quantum memories 154a, 154b, 156a, 156b of each of the two photon entanglement chains 120a, 120b may form first and second cross-chain quantum repeaters 150, 152 including terminating entanglement optics 174 optically coupled to the first and second photon detector units 110, 112. The first and second cross-chain quantum repeaters 150, 152 may be structurally configured to generate measurable entangled particles and the first and the second photon detector units 110, 112 may be structurally configured to receive the measurable entangled particles. In alternative embodiments, the first and second cross-chain quantum repeaters 150, 152 may comprise terminating entanglement optics 174 without terminating quantum memories 154a, 154b, 156a, 156b, for example, terminating entanglement optics 174 structurally configured to entangle pair of particles, such as photons, received by the cross-chain quantum repeaters 150, 152.

In some embodiments, the plurality of optical fiber links 160 may be structurally configured to optically couple the at least one quantum repeater 140a, 140b of each photon entanglement chain 120a, 120b to the first and second terminating quantum memories 154a, 154b, 156a, 156b of each photon entanglement chain 120a, 120b such that photons received by the first and the second terminating quantum memories 154a, 154b, 156a, 156b, or, in the alternative, received by the terminating entanglement optics 174 of the first and second cross-chain repeaters 150, 152, are entangled with photons entangled by the at least one quantum repeater 140a, 140b. Further, the optical fiber links 160 may comprise single core optical fiber links 160 and/or multicore optical fiber links 160 having at least two non-uniform cores structurally configured to provide non-uniform photon propagation delay. For example, the at least two non-uniform cores may comprise differing core lengths, differing diameters, differing refractive indices, or any other non-uniform properties to facilitate non-uniform photon propagation delay, as described in more detail with respect to FIG. 4, below.

In some embodiments, the photon entanglement chains 120a, 120b may include multicore optical fibers 160 and at least two quantum repeaters disposed between the first and second terminating quantum memories 154a, 154b, 156a, 156b of each photon entanglement chain 120a, 120b. The at least two quantum repeaters may be adjacently positioned and optically coupled by the multicore optical fiber links 160. In this embodiment, the photon entanglement chain 100 may be structurally configured in the DLCZ protocol for quantum repeaters, as described in Duan et al., Nature, 414, 22 Nov. 2001, pgs 413-418 and as described in Sangouard et. al., "Quantum repeaters based on atomic ensembles and linear optics," Review of Modern Physics, Vol. 83, 2011, pgs 34-73. In operation, the core length of the optical fiber links 160 may be altered by outside factors, such as temperature. By providing multicore optical fiber links 160 comprising at least two non-uniform cores structurally configured to provide non-uniform photon propagation delay, cores having matching core lengths may be aligned with the at least two quantum repeaters, even when outside factors alter the core lengths.

Referring still to FIG. 1, the quantum key generation system 100 may further comprise one or more alignment mechanisms 180 structurally configured to optically align the at least one quantum repeater 140a, 140b with individual cores of the multicore optical fiber links 160 such that the at least one quantum repeater 140a, 140b may be selectively positioned in optical alignment with an individual core of the multicore optical fiber links 160. In some embodiments, the one or more alignment mechanisms 180 may comprise an alignment stage, an optical switch, or both.

Figure 2:
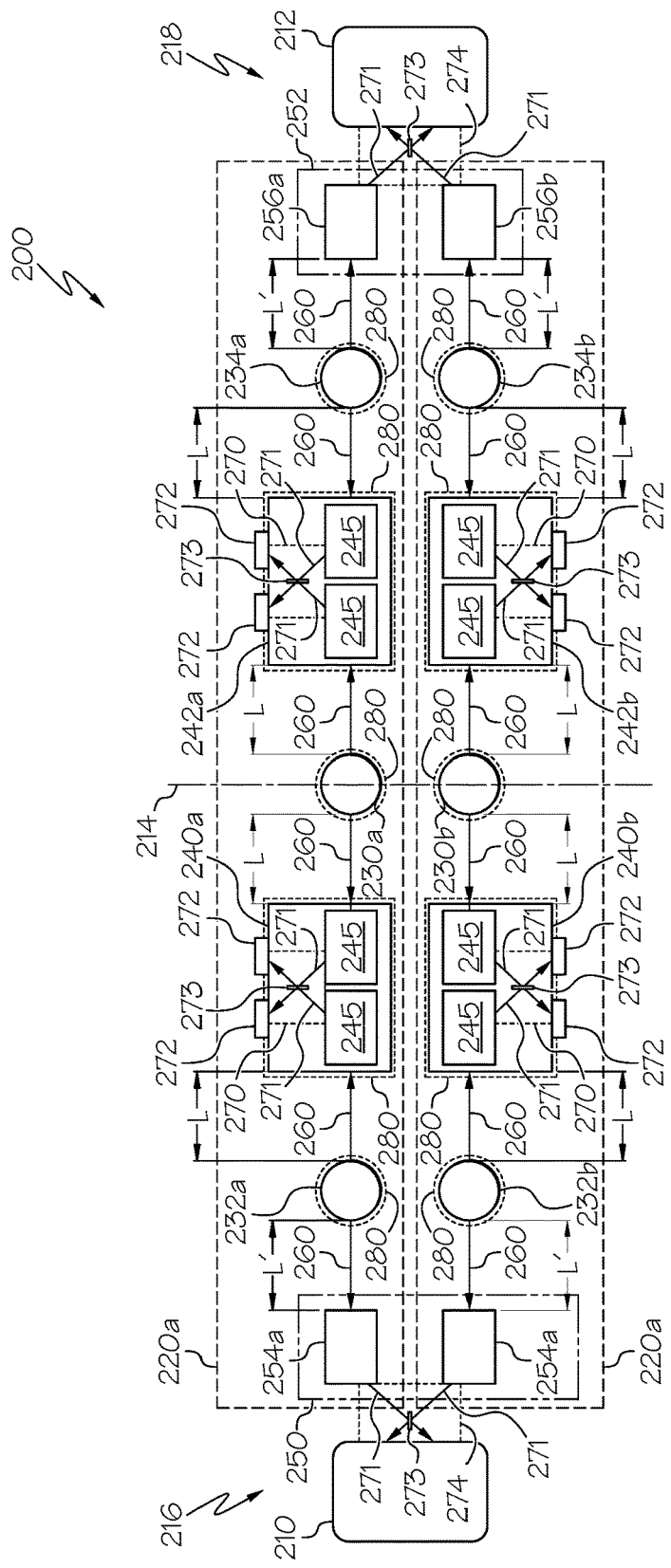
FIG. 2 schematically depicts a quantum key generation system including an originating entangled photon generator according to one or more embodiments shown and described herein.

Referring now to FIG. 2, a quantum key generation system 200 comprising two photon detector units 210, 212 and two photon entanglement chains 220a, 220b is depicted. Each photon entanglement chain 220a, 220b extends between the two photon detector units 210, 212 and comprises an originating entangled photon generator 230a, 230b, first and second intermediate entangled photon generators 232a, 232b, 234a, 234b, first and second intermediate quantum repeaters 240a, 240b, 242a, 242b, and first and second terminating quantum memories 254a, 254b, 256a, 256b. The first and second terminating quantum memories 254a, 254b, 256a, 256b are positioned at first and second ends 216, 218 of the photon entanglement chains 220a, 220b, respectively. The originating entangled photon generators 230a, 230b are positioned at respective origination locations 214 between the first and second ends 216, 218 of the photon entanglement chains 220a, 220b.

The originating entangled photon generators 230a, 230b, the first intermediate entangled photon generators 232a, 232b, and the second intermediate entangled photon generators 234a, 234b are each structurally configured to generate an entangled pair of photons, for example, using a parametric down conversion process. In some embodiments, the entangled photon generators may each comprise a laser source optically coupled to a non-linear crystal. In other embodiments, the entangled photon generators may be structurally configured to generate an entangled pair of photons using a four-wave mixing process, or any method or process of generating an entangled pair of photons. Further, each of the entangled photon generators may be structurally configured to provide entangled photons having any wavelength λ, for example, between about 800 and about 1800 nm, for example about 1550 nm.

Referring still to FIG. 2, the first and second intermediate quantum repeaters 240a, 240b, 242a, 242b of each photon entanglement chain 220a, 220b may be optically coupled to the originating entangled photon generator 230a, 230b of the photon entanglement chains 220a, 220b by optical fiber links 260 of core length L and optically coupled to first and second intermediate entangled photon generators 232a, 232b, 234a, 234b of each photon entanglement chain 220a, 220b by optical fiber links 260 of core length L. It should be understood that optical fiber links 260 may comprise any optical fibers, for example, single core optical fibers, multicore optical fibers, or the like.

The first and second intermediate quantum repeaters 240a, 240b, 242a, 242b of each photon entanglement chain 220a, 220b may each receive, for example, simultaneously receive an individual photon of the entangled pair of photons output by the originating entangled photon generators 230a, 230b and an individual photon output by one of the first or second intermediate entangled photon generators 232a, 232b, 234a, 234b. By providing optical fiber links 260 having core lengths L, the first and second intermediate quantum repeaters 240a 240a, 240b, 242a, 242b may be structurally configured to entangle the received photons upon simultaneous arrival, without delay. In operation, the core length of the optical fiber links 260 may be altered by outside factors, such as temperature. By providing multicore optical fiber links 260 comprising at least two non-uniform cores structurally configured to provide non-uniform photon propagation delay, cores having matching core lengths may be aligned with the first and second intermediate quantum repeaters 240a 240a, 240b, 242a, 242b, even when outside factors alter the core lengths.

In some embodiments, for example, described below with respect to FIGS. 6 and 7, the quantum key generation system 200 may further comprise one or more classical signal generators optically coupled to one or more of the optical fiber links 260, for example, at the same end of the optical fiber links 260 as the originating entangled photon generators 230a, 230b and the first and second first or second intermediate entangled photon generators 232a, 232b, 234a, 234b. In operation, the one or more classical signal generators may generate a classical photon signal that may traverse the optical fiber links 260, for example, simultaneously with the entangled photons generated by the entangled photon generators 230a, 230b 232a, 232b, 234a, 234b. Further, the quantum key generation system 200 may comprise one or more classical signal receivers optically coupled to the optical fiber link 260 opposite one or more classical signal generators to receive one or more classical photon signals generated by the classical signal generators.

As also described below with respect to FIGS. 6 and 7, the quantum key generation system 200 may comprise an optical multiplexer and demultiplexer optically coupled to and positioned on opposite ends of optical fiber links 260 and structurally configured to multiplex and demultiplex classical photon signals and entangled photons. Moreover, the quantum key generation system 200 may comprise an optical encoder and optical decoder optically coupled to and positioned on opposite ends of the optical fiber links 260 and structurally configured to encode and decode the classical photon signals and entangled photons.

Referring again to FIG. 2, the quantum key generation system 200 may further comprise one or more alignment mechanisms 280 structurally configured to optically align the components of the photon entanglement chains 220a, 220b with individual cores of the multicore optical fiber links 260 such that any of the components may be selectively positioned in optical alignment with an individual core of the multicore optical fiber links 260. In some embodiments, the one or more alignment mechanisms 280 may comprise an alignment stage, an optical switch, or both. In some embodiments, the one or more quantum repeaters of the photon entanglement chains 220a, 220b are coupled to alignment mechanisms 280. In some embodiments, the one or more entangled photon generators of the photon entanglement chains 220a, 220b are coupled to alignment mechanisms 280.

Referring still to FIG. 2, the first and second intermediate quantum repeaters 240a, 240b, 242a, 242b of each photon entanglement chain 220a, 220b may be structurally configured such that an entangled pair of photons generated by the originating entangled photon generator 230a, 230b may be entangled with an entangled pair of photons generated by the first and second intermediate entangled photon generators 232a, 232b, 234a, 234b, respectively. For example, in some embodiments, the first and second intermediate quantum repeaters 240a, 240b, 242a, 242b of each photon entanglement chain 220a, 220b may each comprise two quantum memories 245 and entanglement optics 270.

The entanglement optics 270 may include two entangling pathways 271 optically coupled to and extending between the two quantum memories 245 and two entanglement detectors 272. Further, the entanglement detectors 272 may comprise single-photon detectors, such as superconducting nanowire single-photon detectors, low noise photodiodes, or the like. The entanglement optics 270 may further comprise a beamsplitter 273 positioned such that each entangling pathway 271 traverses the beamsplitter 273. The entanglement optics 270 may be structurally configured to entangle pairs of particles when particles output by the quantum memories 245 simultaneously traverse the beamsplitter 273, for example, a pair of Stokes photons or a pair of anti-Stokes photons output by the quantum memories 245. Further, the entanglement optics 270 may be housed within an optical waveguide and the individual intermediate quantum repeater 240a, 240b, 242a, 242b, the associated entanglement optics 270, and the associated entanglement detectors 272 may form a photonic integrated circuit. In alternative embodiments, the first and second intermediate quantum repeaters 240a, 240b, 242a, 242b may comprise entanglement optics 270 without quantum memories 245, for example, entanglement optics 270 structurally configured to entangle pair of particles, such as photons, received by the first and second intermediate quantum repeaters 240a, 240b, 242a, 242b.

In operation, the first and second intermediate quantum repeaters 240a, 240b, 242a, 242b of each photon entanglement chain 220a, 220b may receive an individual entangled photon generated by one of the originating entangled photon generators 230a, 230b, receive an individual entangled photon generated by the first and second intermediate entangled photon generators 232a, 232b, 234a, 234b of one of the photon entanglement chains 220a, 220b, respectively, and entangle the received photons. For example, the first intermediate quantum repeaters 240a, 240b may receive an individual entangled photon generated by the originating entangled photon generator 230a, 230b and may receive an individual entangled photon generated by the first intermediate entangled photon generators 232a, 232b. The second intermediate quantum repeaters 242a, 242b may receive an individual entangled photon generated by the originating entangled photon generator 230a, 230b and may receive an individual entangled photon generated by the second intermediate entangled photon generators 234a, 234b.

The first and second intermediate entangled photon generators 232a, 232b, 234a, 234b of each photon entanglement chain 220a, 220b may be optically coupled to the first and the second terminating quantum memories 254a, 254b, 256a, 256b, respectively, of the photon entanglement chains 220a, 220b by optical fiber links 260 of core length L', where L'>L. The core length L' allows photon entanglement to occur at the first and second intermediate quantum repeaters 240a 240a, 240b, 242a, 242b while individual entangled photons of the pair of entangled photons output by the first and second intermediate entangled photon generators 232a, 232b, 234a, 234b are traveling though the optical fiber link 260 having core length L'. Accordingly, when the photons reach the first and the second terminating quantum memories 254a, 254b, 256a, 256b, the photon arriving at the first terminating quantum memory 254a, 254b of a respective photon entanglement chain 220a, 220b, may be entangled with the photon arriving at the second terminating quantum memory 256a, 256b of the same photon entanglement chain 220a, 220b.

Referring still to FIG. 2, the first and second terminating quantum memories 254a, 254b, 256a, 256b of each of the two photon entanglement chains 220a, 220b form first and second cross-chain quantum repeaters 250, 252, respectively, structurally configured to generate measurable entangled particles. In operation, the cross-chain quantum repeaters 250, 252 entangle photons from each photon entanglement chain 220a, 220b. For example, the first and second cross-chain quantum repeaters 250, 252 may receive photons generated by the first and the second intermediate entangled photon generators 232a, 232b, 234a, 234b of each photon entanglement chain 220a, 220b, respectively, entangle the received photons such that an entangled pair of photons generated by the first and second intermediate entangled photon generators 232a, 232b, 234a, 234b of each photon entanglement chain 220a, 220b are entangled, and generate a measurable entangled particle measurable by the photon detector units 210, 212.

Referring still to FIG. 2, the first and second cross-chain quantum repeaters 250, 252 of each photon entanglement chain 220a, 220b may further comprise terminating entanglement optics 274 including one or more entangling pathways 271 optically coupled to and extending between the terminating quantum memories 254a, 254b, 256a, 256b and the photon detector units 210, 212. The terminating entanglement optics 274 may also include a beamsplitter 273 positioned such that each entangling pathway 271 traverses the beamsplitter. In some embodiments, the terminating entanglement optics 274 may comprise the same components as the entanglement optics 270 and may be positioned at the first end 216 and the second end 218 of the photon entanglement chains 220a, 220b. The terminating entanglement optics 274 may be structurally configured to entangle pairs of particles when particles output by the terminating quantum memories 254a, 254b, 256a, 256b simultaneously traverse the beamsplitter 273. In some embodiments, the terminating entanglement optics 274 may be housed within an optical waveguide. Additionally, the first and second cross-chain quantum repeaters 250,252, the terminating entanglement optics 274, and the photon detector units 210, 212 may form photonic integrated circuits. In alternative embodiments, the first and second cross-chain quantum repeaters 250, 252 may comprise terminating entanglement optics 274 without terminating quantum memories 254a, 254b, 256a, 256b, for example, terminating entanglement optics 274 structurally configured to entangle pair of particles, such as photons, received by the cross-chain quantum repeaters 250, 252.

Referring still to FIG. 2, the first and the second photon detector units 210, 212 are structurally configured to receive the measurable entangled particles generated by the first and second cross-chain quantum repeaters 250, 252, respectively. In some embodiments, each photon detector unit 210, 212 comprises a pair of photon detectors positioned in optical alignment with the terminating quantum memories 254a, 254b, 256a, 256b, and/or the terminating entanglement optics 274 such that a particle generated by an individual terminating quantum memory 254a, 254b, 256a, 256b is received by an individual photon detector. Additionally, the photon detector units 210, 212 may comprise one or more low noise photodiodes and/or one or more single-photon detectors, such as, for example, one or more superconducting nanowire single-photon detectors. In some embodiments, the photon detector units 210, 212 may comprise the same detectors as the entanglement detectors 272; however, any combination of detectors disposed in the quantum key generation system 200 is contemplated.

In operation, the measurable entangled particles generated by the first and the second cross-chain quantum repeaters 250, 252 are entangled by the terminating entanglement optics 274 such that each photon detector unit 210, 212 measures a correlative entangled particle property of the measurable entangled particles. The measurable entangled particles received by each photon detector unit 210, 212 share a quantum state such that measurement of a correlative entangled particle property at the first end 216 correlates with the measurement of a correlative entangled particle property at the second end 218. The correlative entanglement particle property may comprise any measurable quantum property of the measurable entangled particle, for example a linear polarization, a circular polarization, spin, translational momentum, orbital angular momentum, or the like.

In some embodiments, the quantum key generation system 200 may comprise additional quantum repeaters and additional entangled photon generators positioned between the originating location 214 and the first end 216 and positioned between the originating location 214 and the second end 218. The additional quantum repeaters and the additional entangled photon generators may be alternately disposed. Each additional quantum repeater may be disposed between and optically coupled to adjacent entangled photon generators using optical fiber links 260. Each additional entangled photon generator may be disposed between and optically coupled to an additional quantum repeater and one of another additional quantum repeater or an individual terminating quantum memory 254a, 254b, 256a, 256b using optical fiber links 260.

Any number of additional quantum repeaters and additional entangled photon generators optically coupled using optical fiber links 260 are contemplated to increase the length of the photon entanglement chains 220a, 220b, while minimizing signal attenuation between the origination location 214 and the first and second ends 216, 218. Additionally, the pair of optical fiber links 260 that are optically coupled to any one individual quantum repeater may comprise substantially equivalent core lengths such that the individual quantum repeater may simultaneously receive individual photons output by adjacent entangled photon generators. In some embodiments, the pair optical fiber links 260 that are optically coupled to each quantum repeater positioned increasingly outward from the origination location 214 may comprise increasingly lengthened core lengths (e.g., L, L', L", L''', etc.).

In operation, when entangled pairs of photons are simultaneously output by each entangled photon generator, each quantum repeater positioned increasingly outward from the origination location 214 receives photons output by adjacent entangled photon generators after the quantum repeaters positioned closer to the origination location 214 receive and entangle photons. Accordingly, photons traveling away from the origination location 214 become entangled while traversing the optical fiber links 260. This generates a cascading chain of entanglement swapping such that photons received by the terminating quantum memories 254a, 254b at the first end 216 of an individual photon entanglement chain 220a, 220b are entangled, upon arrival, with photons received by the terminating quantum memories 256a, 256b at the second end 218 of the same photon entanglement chain 220a, 220b.

Further, the optical fiber links 260 that are optically coupled to the terminating quantum memories 254a, 254b, 256a, 256b may have the longest core length of the plurality of optical fiber links 260 and the optical fiber links 260 that are optically coupled to the first and second intermediate quantum repeaters 240a 240a, 240b, 242a, 242b may comprise the shortest core length of the plurality of optical fiber links 260.

Referring still to FIG. 2, the correlative entangled particle property measured by each photon detector unit 210, 212 may be converted into a correlative quantum key bit. Each correlative quantum key bit may comprise a binary bit, e.g., a "1" bit or a "0" bit. In some embodiments, the correlative entangled particle property measured by each photon detector unit 210, 212 may comprise a coordinate entangled particle property such that each correlative quantum key bit produced at each photon detector unit comprises a matching binary bit. For example, when the photon detector unit 210 measures a coordinate entanglement property that comprises a "0" bit, the photon detector unit 212 may also measures a coordinate entanglement property that comprises a "0" bit. In other embodiments, the correlative entangled particle property measured by each photon detector unit comprises an orthogonal entangled particle property such that each correlative quantum key bit produced at each photon detector unit comprises an opposite binary bit. For example, when the photon detector unit 210 measures an orthogonal entanglement property that comprises a "0" bit, the photon detector unit 212 also measures an orthogonal entanglement property that comprises a "1" bit.

In some embodiments, the correlative entangled particle property may comprise any quantum information, for example, with or without converting the correlative entangled particle property into a correlative quantum key bit. For example, the photon entanglement chains 220a, 220b are structurally configured to communicate any quantum information between separate locations, for example, between the originating location 214 and one or both of the first end 216 and the second end 218 and between the first and second ends 216, 218. Further, each of the photon entanglement chains 110a, 110b, (FIG. 1) 220a, 220b (FIG. 2), 320a, 320b (FIG. 3) are structurally configured to communicate any quantum information between separate locations by generating particles comprising entangled quantum states and transmitting the entangled quantum states to and between separate locations. In some embodiments, each pair of photon entanglement chains 110a, 110b, (FIG. 1) 220a, 220b (FIG. 2), 320a, 320b (FIG. 3) described herein may be structurally configured as a one-time key pad that operates to communicate quantum information. In a non-limiting example, the quantum communication may comprise any measurable quantum property of the measurable entangled particle, for example a linear polarization, a circular polarization, spin, translational momentum, orbital angular momentum, or the like.

In operation, the photon entanglement chains 220a, 220b are structurally configured to produce correlative quantum key bits or other quantum information at a bit rate $\Gamma$ of between about 1-100 MHz, for example, between about 50-100 MHz. The photon entanglement chains 220a, 220b may be structurally configured to produce correlative quantum key bits or other quantum information at a bit rate $\Gamma$ that is near or substantially equivalent (e.g., within about 1%) to a processing rate $\Pi$ of each quantum repeater such that $\Gamma_{MAX} \leq \Pi_{MAX}$. For example, the bit rate $\Gamma$ may be within about 10% of the processing rate $\Pi$, within about 5% of the processing rate $\Pi$, or within about 1% of the processing rate $\Pi$. For example, the bit rate $\Gamma$ may be increased by providing quantum repeaters structurally configured to entangle photons at an increased processing rate $\Pi$. By increasing the bit rate $\Gamma$ of the photon entanglement chains 220a, 220b, correlative quantum key bits may be generated at high rates allowing quantum keys to be formed quickly with large numbers of bits, increasing the complexity of the quantum key.

Further, in operation, a plurality of iteratively converted correlative quantum key bits may form a quantum key at each photon detector unit 210, 212. For example, each photon detector unit 210, 212 may convert iteratively received correlative quantum key bits into a set of correlative binary bits, such that each photon detector unit 210 and 212 may receive a quantum key correlated with the quantum key received by the other photon detector unit 210, 212. This allows the quantum key to be used as a cryptography key such that communication between the first end 216 and the second end 218 over classical communication channels may be encrypted with the quantum key. Additionally, some embodiments may comprise electronic storage devices communicatively coupled to the photon detector units 210, 212 and structurally configured to electronically store the correlative quantum key bits. In other embodiments, the photon detector units 210, 212 may be structurally configured to electronically store the quantum key.

Figure 3:
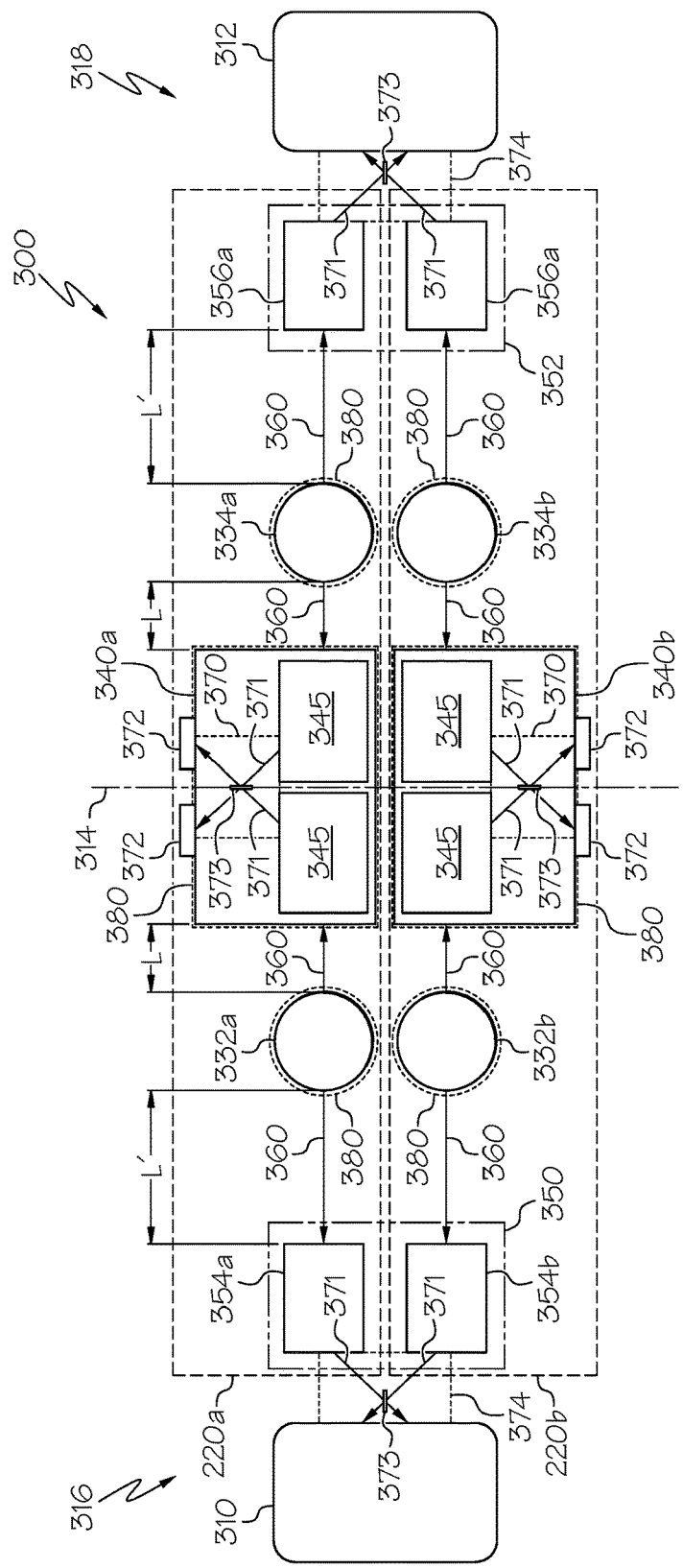
FIG. 3 schematically depicts another quantum key generation system including an originating quantum repeater according to one or more embodiments shown and described herein.

Referring now to FIG. 3, another quantum key generation system 300 is depicted comprising two photon detector units 310, 312 and two photon entanglement chains 320a, 320b. Each photon entanglement chain 320a, 320b extends between the two photon detector units 310, 312. In this embodiment, each photon entanglement chain 320a, 320b comprises an originating quantum repeater 340a, 340b, first and second intermediate entangled photon generators 332a, 332b, 334a, 334b, and first and second terminating quantum memories 354a, 354b, 356a, 356b. The first and second terminating quantum memories 354a, 354b, 356a, 356b are positioned at first and second ends 316, 318 of the photon entanglement chains, respectively.

The originating quantum repeaters 340a, 340b are positioned at respective origination locations 314 between the first and second ends 316, 318 of the photon entanglement chains 320a, 320b. The originating quantum repeaters 340a, 340b may comprise two quantum memories 345 optically coupled to the first and second intermediate entangled photon generators 332a, 332b, 334a, 334b of each photon entanglement chain 320a, 320b by optical fiber links 360 of core length L. Further, the optical fiber links 360 may comprise any optical fiber links, for example, single core optical fiber links and/or multicore optical fiber links 360 having at least two non-uniform cores structurally configured to provide non-uniform photon propagation delay. For example, the at least two non-uniform cores may comprise differing core lengths, differing diameters, differing refractive indices, or any other non-uniform properties to facilitate non-uniform photon propagation delay.

The first and second intermediate entangled photon generators 332a, 332b, 334a, 334b of each photon entanglement chain 320a, 320b are optically coupled to the first and the second terminating quantum memories 354a, 354b, 356a, 356b, respectively, of the photon entanglement chains 320a, 320b by optical fiber links 360 of core length L', where L'>L. The first and second intermediate entangled photon generators 332a, 332b, 334a, 334b are each structurally configured to generate an entangled pair of photons and may comprise any of the entangled photon generators described above with respect to the quantum key generation system 200.

In some embodiments, for example, described below with respect to FIGS. 6 and 7, the quantum key generation system 300 may further comprise one or more classical signal generators optically coupled to one or more of the optical fiber links 360, for example, at the same end of the optical fiber links 360 as the first and second intermediate entangled photon generators 332a, 332b, 334a, 334b. In operation, the one or more classical signal generators may generate a classical photon signal that may traverse the optical fiber links 360, for example, simultaneously with the entangled photons generated by the first and second intermediate entangled photon generators 332a, 332b, 334a, 334b. Further, the quantum key generation system 200 may comprise one or more classical signal receivers optically coupled to the optical fiber link 360 opposite one or more classical signal generators to receive one or more classical photon signals generated by the classical signal generators.

As also described below with respect to FIGS. 6 and 7, the quantum key generation system 300 may comprise an optical multiplexer and demultiplexer optically coupled to and positioned on opposite ends of optical fiber links 360 and structurally configured to multiplex and demultiplex classical photon signals and entangled photons. Moreover, the quantum key generation system 300 may comprise an optical encoder and optical decoder optically coupled to and positioned on opposite ends of the optical fiber links 360 and structurally configured to encode and decode the classical photon signals and entangled photons.

Referring again to FIG. 3, the quantum key generation system 300 may further comprise one or more alignment mechanisms 380 structurally configured to optically align the components of the photon entanglement chains 320a, 320b with individual cores of the multicore optical fiber links 360 such that any of the components may be selectively positioned in optical alignment with an individual core of the multicore optical fiber links 360. In some embodiments, the one or more alignment mechanisms 380 may comprise an alignment stage, an optical switch, or both. In some embodiments, the originating quantum repeater 340a, 340b of the photon entanglement chains 320a, 320b are coupled to alignment mechanisms 380. In some embodiments, the one or more entangled photon generators of the photon entanglement chains 320a, 320b are coupled to alignment mechanisms 380.

The originating quantum repeaters 340a, 340b of each photon entanglement chain 320a, 320b may be structurally configured such that an entangled pair of photons generated by the first intermediate entangled photon generators 332a, 332b are entangled with an entangled pair of photons generated by the second intermediate entangled photon generators 334a, 334b, respectively. For example, the originating quantum repeater 340a, 340b of each photon entanglement chain 320a, 320b may comprise two quantum memories 345 and entanglement optics 370 including two entangling pathways 371. The entangling pathways 371 are each optically coupled to and extend between one of the two quantum memories 345 and one of two entanglement detectors 372. The entanglement optics 370 may also include a beamsplitter 373 positioned such that each entangling pathway 371 traverses the beamsplitter 373. Further, the entanglement optics 370 are structurally configured to entangle pairs of particles output by the quantum memories 345 when the pair of particles simultaneously traverse the beamsplitter, as described above with respect to quantum key generation system 200. In alternative embodiments, the originating quantum repeaters 340a, 340b may comprise entanglement optics 370 without quantum memories 345, for example, entanglement optics 370 structurally configured to entangle pair of particles, such as photons, received by the originating quantum repeaters 340a, 340b.

The first and second terminating quantum memories 354a, 354b, 356a, 356b of each of the two photon entanglement chains 320a, 320b may form first and second cross-chain quantum repeaters 350, 352, respectively, structurally configured to generate measurable entangled particles. The first and second cross-chain quantum repeaters 350, 352 may comprise terminating entanglement optics 374 and may be the first and second cross-chain quantum repeaters 250, 252, as described above with respect to quantum key generation system 200.

Referring still to FIG. 3, first and the second photon detector units 310, 312 may be structurally configured to receive the measurable entangled particles generated by the first and second cross-chain quantum repeaters 350, 352, respectively. The photon detector units 310, 312 may comprise any of the photon detectors described above with respect to quantum key generation systems 100 and 200. Further each photon detector unit 310, 312 may comprise a pair of photon detectors positioned in optical alignment with the terminating quantum memories 354a, 354b, 356a, 356b such that a particle generated by an individual terminating quantum memory 354a, 354b, 356a, 356b is received by an individual photon detector 310, 312.

In operation, the measurable entangled particles generated by the first and the second cross-chain quantum repeaters 350, 352 are entangled by the terminating entanglement optics 374 such that each photon detector unit 310, 312 may be a correlative entangled particle property of the measurable entangled particles, converts the correlative entangled particle property into a correlative quantum key bit, and generates a quantum key as described above with respect to quantum key generation system 200.

Further, in some embodiments, the quantum key generation system 300 may comprise additional quantum repeaters and additional entangled photon generators positioned between the originating location 314 and the first end 316 and positioned between the originating location 314 and the second end 318, as described above with respect to quantum key generation system 200.

In operation, the photon entanglement chains 320a, 320b are structurally configured to produce correlative quantum key bits at a bit rate Γ of between about 1-100 MHz, for example, between about 50-100 MHz. The photon entanglement chains 320a, 320b may be structurally configured to produce correlative quantum key bits at a bit rate Γ that is near or substantially equivalent (e.g., within about 1%) to a processing rate Π of each quantum repeater such that ΓMAX≤ΠMAX. For example, the bit rate Γ may be within about 10% of the processing rate Π, within about 5% of the processing rate Π, or within about 1% of the processing rate Π. For example, the bit rate Γ may be increased by providing quantum repeaters structurally configured to entangle photons at an increased processing rate Π. By increasing the bit rate Γ of the photon entanglement chains 320a, 320b, correlative quantum key bits may be generated at high rates allowing quantum keys to be formed quickly with increasing numbers of bits, increasing the complexity of the quantum key.

Referring again to FIGS. 1-3, when the optical fiber links 160, 260, 360 comprise multicore optical fiber links, individual cores of the multicore optical fiber links 160, 260, 360 may provide photon propagation pathways for one of the photon entanglement chains 120a, 220a, 320a and other individual cores of the same multicore optical fiber link 160, 260, 360 may provide photon propagation pathways for another of the photon entanglement chains 120b, 220b, 320b.

Referring still to FIGS. 1-3, the optical fiber links 160, 260, 360 may be structurally configured to receive a calibration signal from an optical time-domain reflectometer, or the like, for measurement of the core length of the optical fiber links 160, 260, 360. This allows actual core lengths of the optical fiber links 160, 260, 360 to be determined such that cores having the desired core lengths L, L', L", L'", etc. may be optically coupled to the components of the photon entanglement chains, even when outside factors (e.g., temperature, or the like) alter the core lengths of the individual cores. By providing optical fiber links 260 having desired core lengths L, L', L", L'", etc., the bit rate Γ of the photon entanglement chains 110a, 110b, 220a, 220b, 320a, 320b may not be slowed by misaligned cores. This alignment allows the bit rate ΓMAX to be substantially equivalent (e.g., within about 1%) ΠMAX, as discussed above.

Figure 4:
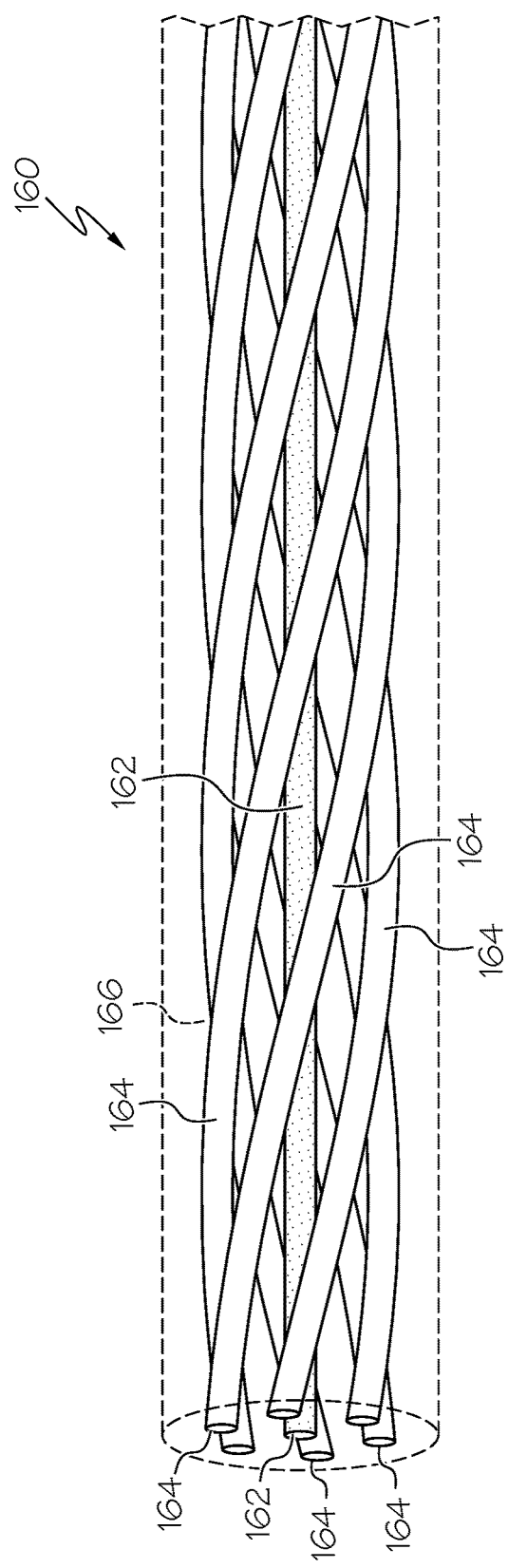
FIG. 4 schematically depicts an example multicore optical fiber link according to the embodiments shown and described herein.

Referring now to FIG. 4, a non-limiting, multicore embodiment of the optical fiber links 160 comprising cores 162, 164 and cladding 166 is depicted. The multicore optical fiber links 160 may comprise single mode multicore optical fibers comprising between about 2 and about 20 cores. Further, the multicore optical fiber links 160 may comprise at least two non-uniform cores structurally configured to provide non-uniform photon propagation delay. The multicore embodiment of the multicore fiber link 160 depicted in FIG. 4 may be disposed in any of the quantum key generation systems 100, 200, 300, described above.

In some embodiments, at least two cores 162, 164 of an individual multicore optical fiber link 160 comprise different refractive index profiles such that photon propagation delay between the at least two cores 162, 164 differs. For example, at least one core of the multicore optical fiber links 160 may comprise a step index profile, a graded index profile, a parabolic index profile, a triangular index profile, or the like. For example, at least one core of the multicore optical fiber links may comprise a refractive index profile of $n(r)^2 = n_1^2(1 - 2\Delta(r/a)^\alpha)$ where: r comprises a radial position within the core, $n_1$ comprises a refraction index at r=0, α comprises a refractive index constant, a comprises a radius of the cladding 166, and $\Delta = (n_1 - n_2)/n_1$, where $n_2$ comprises a refractive index of the cladding 166. Further, the propagation delay for an optical core having a refractive index constant α is described in Keck, Donald, *Fundamentals of Optical Fiber Communications*, Academic Press, 1981. For example, equation 1.131 on page 59 provides an example of propagation delay for an optical core having a refractive index constant α, describing that:

$$\tau_m = \frac{NL}{c}\left\{1 + \Delta\left[\frac{(\alpha-2-\varepsilon)}{(\alpha+2)}\right]\left(\frac{m}{M}\right)^{\frac{2\alpha}{\alpha+2}} + \Delta^2\left[\left(\frac{3\alpha-2-2\varepsilon}{2(\alpha+2)}\right)\right]\left(\frac{m}{M}\right)^{\frac{4\alpha}{\alpha+2}}\right\} + 0\Delta^3$$

$$\text{where } m = 1, M = n_1 ka\left(\frac{2\Delta\alpha}{\alpha+2}\right)^{\frac{1}{2}},$$

a comprises the radius of an individual core, $\Delta = (n_1 - n_2)/n_1$, $n_1$ comprises a refractive index at r=0, $n_2$ comprises a refractive index of the cladding 166, $k = 2\pi/\lambda$, λ comprises the wavelength of photons generated by the entangled photon generators or the quantum repeaters of the quantum key entanglement systems 100, 200, 300, α=2 when the refractive index is a parabolic index, α=1 when the refractive index comprises a triangular refractive index, α=∞ when the refractive index comprises a step refractive index. Accordingly, the multicore optical fiber 160 may comprise cores having differing refractive indices, e.g., differing α values, such that each at least two cores provide non-uniform photon propagation delay even in embodiments in which the at least two cores comprise equivalent core lengths.

In some embodiments, the multicore optical fiber links 160 may comprise spun multicore optical fiber links 160 comprising a central core 162 and one or more radially offset cores 164. The spun multicore optical fiber links may comprise any spin configurations, such as unidirectional spin configurations, bidirectional spin configurations, or the like. For example, the spun multicore optical fiber links 160 may comprise a unidirectional spin configuration having a spin profile of $\alpha(z) = \alpha_0$, where $\alpha(z)$ comprises a unidirectional spin profile at a coordinate (z) along the fiber link length and $\alpha_0$ comprises a spin amplitude in turns/unit length. In this embodiment, the spin amplitude $\alpha_0$ may be about 1-10 turns/meter, e.g., about 3-5 turns/meter. Non-limiting example spun multicore optical fiber links may be found in U.S. Pat. Pub. No. 2013/0308913 and U.S. Pat. Pub. No. 2011/0129190.

In some embodiments, the spun multicore optical fiber links 160 may comprise a bidirectional spin configuration having a spin profile of $\alpha = \alpha_0 \sin(2\pi z/\Lambda)$, where α comprises a bidirectional spin profile, $\alpha_0$ comprises a spin amplitude in turns/unit length, Λ comprises a spin period length, and z comprises a fiber link length. In this embodiment, the spin amplitude $\alpha_0$ may be about 1-10 turns/meter, e.g., about 3-5 turns/meter, the spin period length Λ may be about 0.1-50 meters, e.g., about 3-25 meters. In other embodiments, the spun multicore optical fiber links 160 may comprise a square or triangular bidirectional spin profile.

Referring still to FIG. 4, the central core 162 may have a different core length than the one or more radially offset cores 164. For example, in some embodiments, a core optical path length difference between the central core 162 and the individual radially offset core 164 is $\Delta L = N\{[(2a\pi)^2 + \Lambda^2]^{1/2} - \Lambda\}$ where: $\Lambda$ comprises an optical fiber spin length, a comprises a radial distance between the central core 162 and the individual radially offset core 164; and N comprises a total number of spins over the length L of the optical fiber link. Accordingly, the spun multicore optical fiber 160 may comprise cores having differing core lengths such that each at least two cores provide non-uniform photon propagation delay. It should be understood that multicore optical fibers comprising at least two cores that provide non-uniform photon propagation delay may comprise any combination of refractive index profiles, spin configurations, and/or spin profiles.

Figure 5:
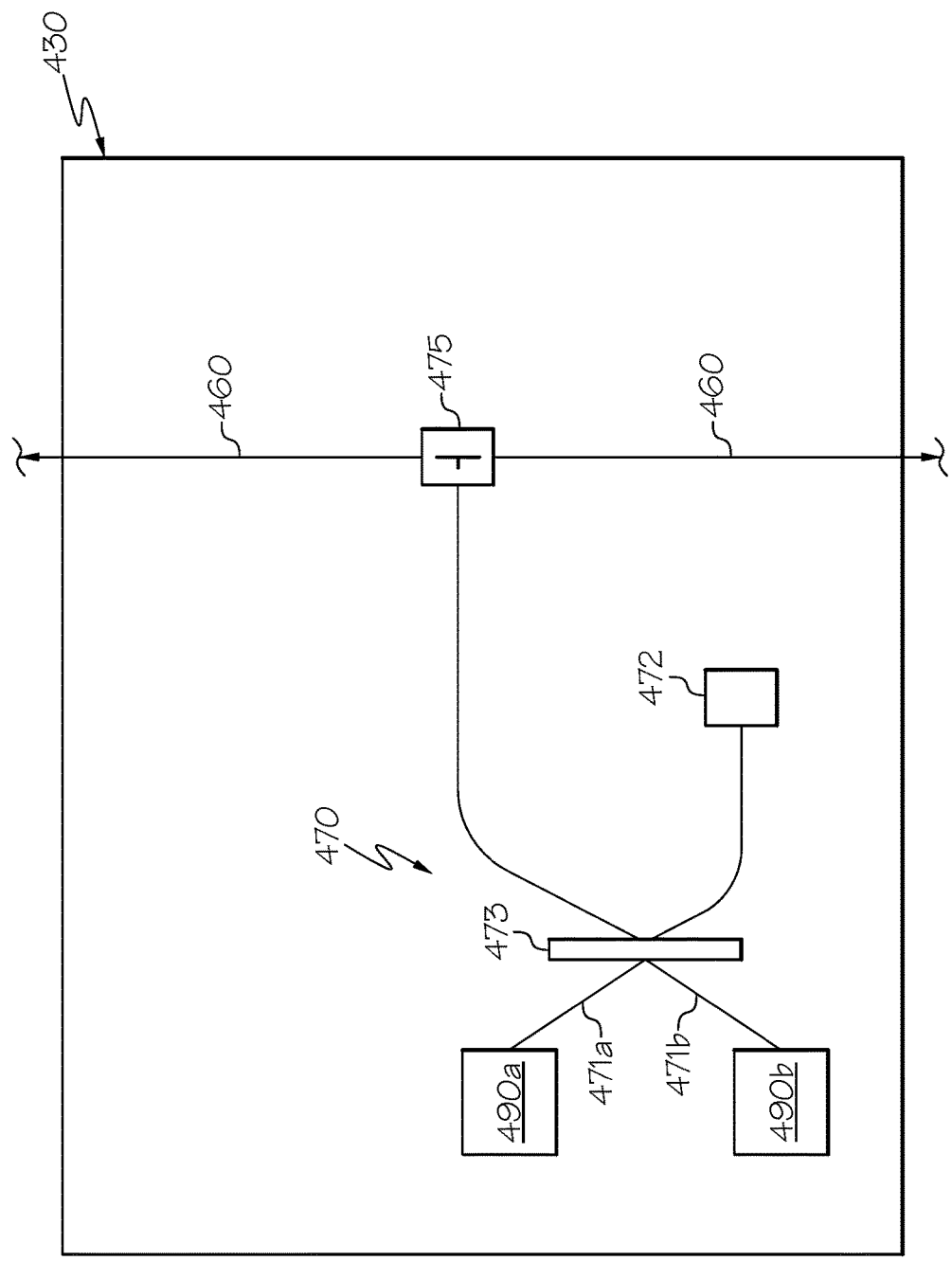
FIG. 5 schematically depicts an example entangled photon generator according to one or more embodiments shown and described herein.

Referring now to FIG. 5, a non-limiting embodiment of an entangled photon generator 430 is depicted. The entangled photon generator 430 is structurally configured to generate four or more entangled photons, for example, two or more entangled pairs of photons. The entangled photon generator 430 may be positioned in any of the photon entanglement chains 220a, 220b, 320a, 320b of the quantum key generation systems 200, 300, described above. For example, the entangled photon generator 430 may comprise an originating entangled photon generator, for example, any of the originating entangled photon generators 230a, 230b (FIG. 2). In some embodiments, the entangled photon generator 430 may also comprise an intermediate entangled photon generator, for example, any of the intermediate entangled photon generators 232a, 232b, 234a, 234b, 332a, 332b, 334a, 334b (FIGS. 2 and 3). Further, as depicted in FIG. 5, optical fiber links 460 are optically coupled to the entangled photon generator 430, may comprise any of the optical fiber links 160, 260, 360 (FIGS. 1-3). The optical fiber links 460 may optically couple the entangled photon generator 430 with an adjacent quantum repeater, for example, the originating quantum repeaters 340a, 340b (FIG. 3), the intermediate quantum repeaters 240a, 240b, 242a, 242b (FIG. 2) and the cross-chain quantum repeaters 150, 152, 250, 252, 350, 352 (FIGS. 1-3).

In operation, by positioning one or more entangled photon generators 430 in any of the photon entanglement chains 220a, 220b, 320a, 320b, each entangled photon generator 430 may output two or more entangled photons into each optical fiber link 460. When two or more entangled photons are output into each optical fiber link 460, if one entangled photon of the two or more entangled photons is attenuated as the two or more entangled photons traverse the optical fiber link 460, the one or more remaining entangled photons of the two or more entangled photons may be received by the adjacent quantum repeater (e.g., the originating, intermediate, or cross-chain quantum repeater). By generating additional entangled photons with the entangled photon generator 430, the core length of each optical fiber link 460 may be lengthened without photon attenuation reducing the success rate of the quantum key generation system 100, 200, 300 such that each cross-chain quantum repeater 150, 152, 250, 252, 350, 352 receives at least one entangled photon and each photon detector unit 110, 112, 210, 212, 310, 312 receives at least one measurable entangled particle. For example, when the entangled photon generator 430 is structurally configured to output four entangled photons, the core length of each optical fiber link 460 may be doubled (e.g., 2L, 2L', 2L", etc.). For example, each optical fiber link 460 may comprise about 5 km, 10 km, 20 km, 40 km or more.

As depicted in FIG. 5, the entangled photon generator 430 may comprise two parametric down conversion generators 490a, 490b (each configured to output an entangled pair of photons), entanglement optics 470, a pathway splitter 475, and an entanglement detector 472. In some embodiments, the entanglement optics 470 comprise a first entangling pathway 471a optically coupled to and extending between a first parametric down conversion generator 490a and the entanglement detector 472 and a second entangling pathway 471b optically coupled to and extending between a second parametric down conversion generator 490b and the pathway splitter 475. Additional entangling pathways 471 are contemplated in embodiments comprising additional parametric down conversion generators 490. In some embodiments, the entanglement optics 470 further comprise a beamsplitter 473 positioned such that each entangling pathway 471a, 471b traverses the beamsplitter 473. In operation, the entanglement optics 470 are structurally configured to entangle multiple photons when the multiple photons simultaneously traverse the beamsplitter 473. For example, when each entangled pair of photons output by the parametric down conversion generators 490a, 490b simultaneously traverse the beamsplitter 473, all four photons are entangled with each other.

Further, the entanglement optics 470 are configured such that some or all of the entangled photons output by each of the parametric down conversion generators 490a, 490b are received by the entanglement detector 472 and/or the pathway splitter 475. For example, when a first entangled pair of photons are output by the first parametric down conversion generator 490a and a second entangled pair of photons are output by the second parametric down conversion generator 490a and these two entangled pairs of photons are entangled with each other at the beamsplitter 473, there is a probability that one of at least three outcomes occur, which are mathematically described by the wave function:

$$|\Psi\rangle_{AA'} = -\left[\frac{1}{2}|2,2\rangle + \sqrt{\frac{3}{8}}(|4,0\rangle + |0,4\rangle)\right].$$

In a first outcome, both the entanglement detector 472 and the pathway splitter 475 receive two of the four entangled photons, mathematically described by the ket $|2,2\rangle$ in the above wave function. In a second outcome, the entanglement detector 472 receives the four entangled photons, mathematically described by one of the kets $|4,0\rangle$ or $|4,0\rangle$ in the above wave function. In a third outcome, the pathway splitter 475 receives the four entangled photons, mathematically described by one of the kets $|4,0\rangle$ or $|4,0\rangle$ in the above wave function. In some embodiments, the probability that the pathway splitter 475 receives the four entangled photons is about 3/8. Further, embodiments comprising additional parametric down conversion generators are contemplated such that additional entangled pairs of photons (e.g., N entangled photons) may be entangled by the entanglement optics 470. In an embodiment comprising N entangled photons, the probability that the N entangled photons are received by the entanglement detector 472, the pathway splitter 475, or a combination of both is mathematically described by the generalized ket:

$$|N, N\rangle_{out} = \frac{i^N}{N!2^N}\sum_{p=0}^{N}\binom{N}{p}\sqrt{(2p)!(2N-2p)!}\,|2p, 2N-2p\rangle.$$

Further, in some embodiments, at least a portion of both the first and second entangling pathways 471a, 471b may comprise multicore optical fibers. For example, a portion of the first entangling pathway 471a that extends between the beamsplitter 473 and the pathway splitter 475 and a portion of the second entangling pathway 471b that extends between the beamsplitter 473 and the pathway splitter 475 may each comprise multicore optical fiber. In some embodiments, at least a portion of both the first and second entangling pathways 471a, 471b may comprise one or more optical waveguides.

In some embodiments, the pathway splitter 475 is structurally configured to direct entangled pairs of photons into optical fiber links 460 optically coupled to the pathway splitter 475. For example, when the pathway splitter 475 receives four entangled photons, the pathway splitter 475 may direct two of the four entangled photons into one optical fiber link 460 and the pathway splitter 475 may direct two of the four entangled photons into another optical fiber link 460. Further, in embodiments when the entangled photon generator 430 is configured to generate more than four entangled photons, the pathway splitter 475 may direct a first subset (e.g., about half) of the entangled photons into one optical fiber link 460 and the pathway splitter 475 may also direct a second subset (e.g., about half) of the entangled photons into another optical fiber link 460. In some embodiments, the pathway splitter 475 may comprise a fused biconical taper splitter, a planar lightwave circuit splitter, or the like.

In some embodiments, the entanglement detector 472 is structurally configured to measure the number of photons received by the entanglement detector 472, which also provides information regarding the number of photons received by the pathway splitter 475. For example, if two entangled photons are output by each of the first and second parametric down conversion generators 490a, 490b and zero entangled photons are received by the entanglement detector 472, than all four entangled photons are received by the pathway splitter 475. In some embodiments, the entanglement detector 472 may comprise a multi-photon detector. In alternative embodiments, the entanglement detector 472 may comprise a single-photon detector, e.g., a superconducting nanowire single-photon detector, a low noise photodiode, or the like.

In some embodiments, the parametric down conversion generators 490a, 490b of the entangled photon generator 430 may each comprise a laser source optically coupled to one or more non-linear crystals. In some embodiments, when the parametric down conversion generators 490a, 490b each comprise a single laser source optically coupled to a single non-linear crystal, each parametric down conversion generator 490a, 490b may output two entangled photons such that the entangled photon generator 430 outputs four entangled photons. For example, the laser source may be configured to output photons comprising a wavelength λ of between about 600 nm and about 1000 nm (e.g., 750 nm, 800 nm, 850 nm, or the like) into the non-linear crystal, which generates two entangled photons, each comprising a wavelength λ of between about 1200 nm and about 2000 nm (e.g., 1400 nm, 1550 nm, 1700 nm, or the like).

In another embodiment, when the parametric down conversion generators 490a, 490b comprise a single laser source optically coupled to two non-linear crystals, each parametric down conversion generator 490a, 490b may output four entangled photons such that the entangled photon generator 430 outputs eight entangled photons. For example, the laser source may be configured to output photons comprising a wavelength λ of between about 300 nm and about 500 nm (e.g., 350 nm, 400 nm, 450 nm, or the like) into a first non-linear crystal, which generates two entangled photons, each comprising a wavelength λ of between about 600 nm and about 1000 nm (e.g., 750 nm, 800 nm, 850 nm, or the like). These two entangled photons then enter a second non linear crystal, which generates four entangled photons, each comprising a wavelength λ of between about 1200 nm and about 2000 nm (e.g., 1400 nm, 1550 nm, 1700 nm, or the like). In alternative embodiments, the entangled photon generators 430 may be structurally configured to generate an entangled pairs of photons using a four-wave mixing process or any other method or process of generating an entangled pair of photons.

Figure 6:
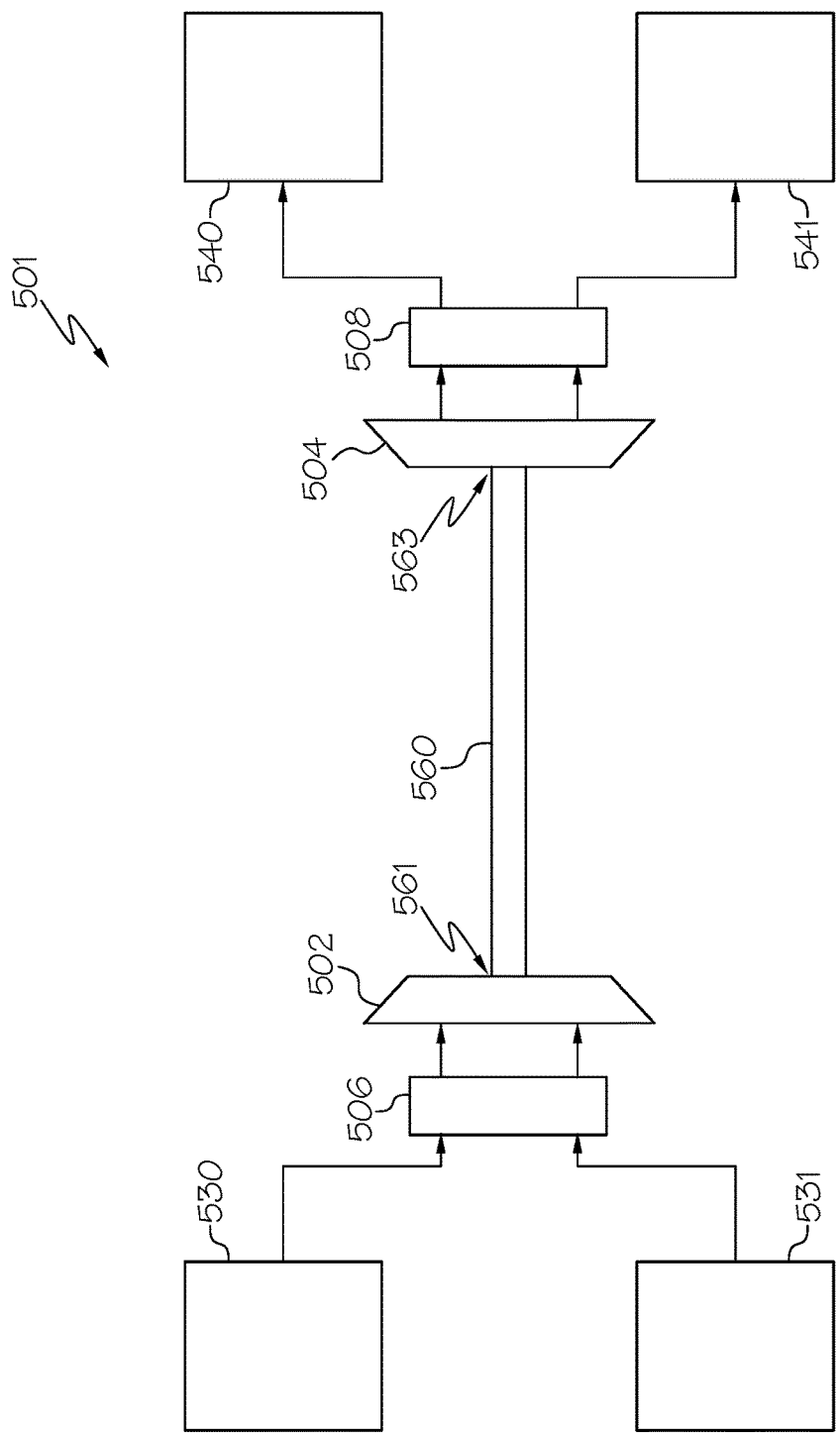
FIG. 6 schematically depicted a signal linking system according to one or more embodiments shown and described herein.

Referring now to FIG. 6, a non-limiting embodiment of a signal linking system 501 is depicted. As described below, the signal linking system 501 is structurally configured to provide an optical pathway for both classical photon signals and quantum photon signals. The signal linking system 501 may be positioned in any of the photon entanglement chains 120a, 120b, 220a, 220b, 320a, 320b of the quantum key generation systems 100, 200, 300, described above. Further, the signal linking system 501 may be positioned in any known or yet to be developed quantum system having optical pathways for classical photon signals and quantum photon signals.

As depicted in FIG. 6, the signal linking system 501 comprises an optical fiber link 560, one or more quantum signal generators 530, one or more classical signal generators 531, one or more quantum signal receivers 540, and one or more classical signal receivers 541. Further, the signal linking system 501 may comprise one or more optical multiplexers 502, one or more optical demultiplexers 504, one or more optical encoders 506, and one or more optical decoders 508. The optical fiber link 560 comprises an input end 561 opposite an output end 563 and one or more cores 562 (FIG. 7) extending between the input end 561 and the output end 563, which may be opposite the input end 561. The optical fiber link 560 may comprise a single core optical fiber link or a multicore optical fiber link. For example, the optical fiber link 560 may comprise any of the optical fiber links described above, such as optical fiber links 160, 260, 360, or 460.

Referring still to FIG. 6, the one or more quantum signal generators 530 are structurally configured to generate quantum photon signals, which may comprise entangled or non-entangled photons. While one quantum signal generator 530 is depicted in FIG. 6, it should be understood that any number of quantum signal generators 530 are contemplated, such that multiple quantum photon signals may traverse the optical fiber link 560, for example, simultaneously. Moreover, the one or more quantum signal generators 530 may each be configured to generate quantum photon signals such that multiple quantum photon signals may be generated by a single quantum signal generator 530. The one or more quantum signal generators 530 include a laser source which may be optically coupled to a non-linear crystal. In embodiments in which the quantum signal generator 530 generates entangled photons, the quantum signal generator 530 may generate entangled photons using a parametric down conversion process, a four-wave mixing process, or any other method or process of generating entangled photons. Moreover, the quantum signal generator 530 may be structurally configured to generate a quantum photon signal having any wavelength $\lambda_q$, for example, a wavelength $\lambda_q$ between about 800 nm and about 1800 nm, such as about 1495 nm, about 1550 nm, or the like.

Further, in embodiments in which the signal linking system 501 is positioned in any of the photon entanglement chains 120a, 120b, 220a, 220b, 320a, 320b of the quantum key generation systems 100, 200, 300, the one or more quantum signal generators 530 may comprise any of the entangled photon generators or quantum repeaters described above with respect to FIGS. 1-5. For example, the one or more quantum signal generators 530 may comprise a quantum repeater, such as the quantum repeaters 140a, 140b of the photon entanglement chains 120a, 120b (FIG. 1) or any quantum repeater structurally configured to output one or more photons. Further, the one or more quantum signal generators 530 may comprise an originating entangled photon generator, for example, any of the originating entangled photon generators 230a, 230b (FIG. 2). In some embodiments, the one or more quantum signal generators 530 may also comprise an intermediate entangled photon generator, for example, any of the intermediate entangled photon generators 232a, 232b, 234a, 234b, 332a, 332b, 334a, 334b (FIGS. 2 and 3). In some embodiments, the one or more quantum signal generators 530 may comprise the entangled photon generator 430 (FIG. 5).

The one or more quantum signal receivers 540 may comprise any photon receiver structurally configured to receive the quantum photon signals generated by the one or more quantum signal generators 530. While one quantum signal receiver 540 is depicted in FIG. 6, it should be understood that any number of quantum signal receivers 540 are contemplated. As one non-limiting example, the one or more quantum signal receivers 540 may comprise one or more of the quantum repeaters, quantum memories, and photon detectors described above with respect to FIGS. 1-5. As one non-limiting example, the one or more quantum signal receivers 540 may comprise any of the quantum repeaters 140a, 140b, the first and second terminating quantum memories 154a, 154b, 156a, 156b, and the photon detector units 110, 112 (FIG. 1). As another non-limiting example, the one or more quantum signal receivers 540 may comprise any of the photon detector units 210, 212, the first and second intermediate quantum repeaters 240a, 240b, 242a, 242b, and the first and second terminating quantum memories 254a, 254b, 256a, 256b (FIG. 2). Further, as another non-limiting example, the one or more quantum signal receivers 540 may comprise the photon detector units 310, 312, the originating quantum repeater 340a, 340b, and the first and second terminating quantum memories 354a, 354b, 356a, 356b (FIG. 3).

Referring still to FIG. 6, the one or more classical signal generators 531 are structurally configured to generate classical photon signals, which are photon signals having a higher optical power than the quantum photon signals. In operation, quantum effects may be too small to effect the propagation and detection of the classical photon signals but may effect the propagation and detection of the quantum photon signals. While one classical signal generator 531 is depicted in FIG. 6, it should be understood that any number of classical signal generators 531 are contemplated, such that multiple classical photon signals may traverse the optical fiber link 560, for example, simultaneously. Moreover, the one or more classical signal generators 531 may each be configured to generate multiple classical photon signals such that multiple classical photon signals may be generated by a single classical signal generator 531.

The one or more classical signal generators 531 may comprise any known or yet to be developed laser source or other photon generating device. The one or more classical signal generators 531 may be structurally configured to generate classical photon signals having any wavelength $\lambda_c$, for example, between about 800 nm and about 1800 nm, such as about 1495 nm, about 1550 nm, or the like. In operation, the one or more classical signal generators 531 may generate classical photon signals having a higher wavelength $\lambda_c$ than the wavelength $\lambda_q$ generated by the one or more quantum signal generators 530. Further, the one or more classical signal receivers 541 are structurally configured to receive the classical photon signals generated by the one or more classical signal generators 531. For example, the one or more classical signal receivers 541 may comprise any electronic device structurally configured to receive an optical signal, for example, a photon detector or any known or yet to be developed optical signal receiver.

Figure 7:
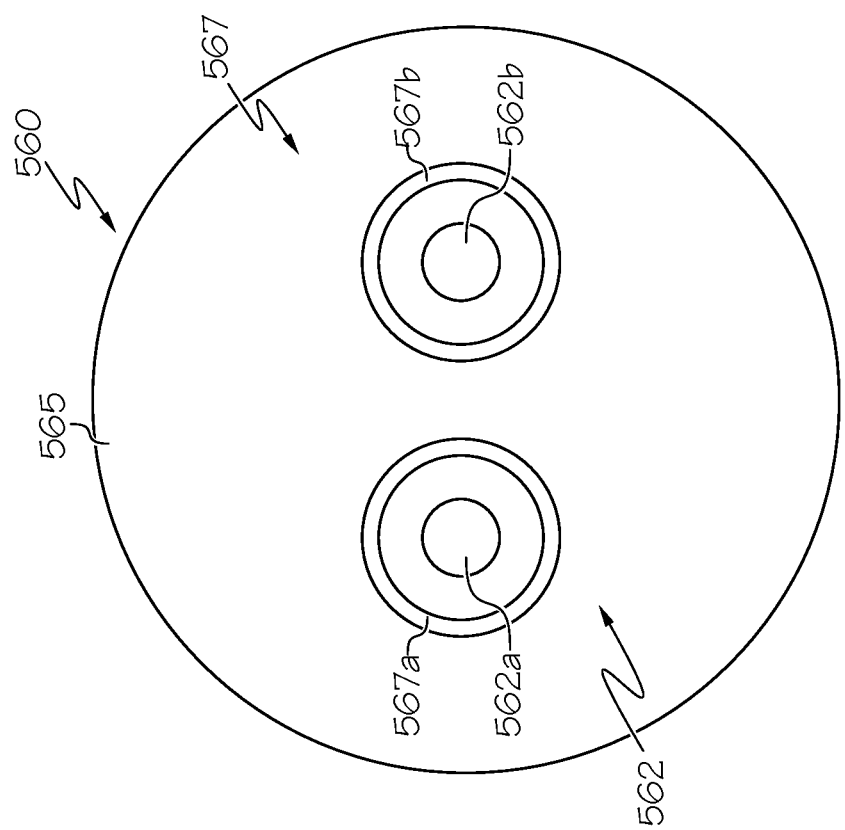
FIG. 7 schematically depicts an example optical fiber link of the signal linking system of FIG. 6 according to one or more embodiments shown and described herein.

Referring now to FIGS. 6 and 7, the optical fiber link 560 may comprise glass, fiberglass, plastic, polymer, or any other waveguiding material. For example, the optical fiber link 560 may comprise silica glass, doped silica glass, e.g., Ge doped silica glass, or the like. As non-limiting examples, the optical fiber link 560 may comprise Corning® Vascade® EX2000 optical fiber, Corning® Vascade® EX3000 optical fiber, Corning® Vascade® LEAF® optical fiber, Corning® SMF-28® Ultra optical fiber, Corning® SMF-28® ULL optical fiber. Further, the optical fiber link 560 may be structurally configured such that optical signals traversing the optical fiber link 560 attenuate at an optical attenuation rate of about 1 dB/km or less, for example, 0.5 dB/km, 0.25 dB/km, 0.2 dB/km, 0.17 dB/km, 0.165 dB/km, 0.16 dB/km, 0.15 dB/km, 0.1 dB/km, 0.05 dB/km, 0.01 dB/km, or less. By lowering the optical attenuation, the length of the optical fiber link 560 may be increased.

As depicted in FIG. 7, the optical fiber link 560 comprises one or more cores 562, for example, a first core 562a and a second core 562b. The optical fiber link 560 also includes a cladding 525 surrounding the one or more cores 562, for example, surrounding both the first core 562a and the second core 562b, as depicted in FIG. 7. While two cores 562a, 562b are depicted, it should be understood that any number of cores 562 are contemplated, for example, a single core 562 or more than two cores 562, such as four cores 562, seven cores 562, eight cores 562, twelve cores 562, nineteen cores 562, or the like. Further, in some embodiments, the optical fiber link 560 may comprise spun multicore optical fiber as described above with respect to FIG. 4.

As one non-limiting example, the first core 562a of the optical fiber link 560 may be optically coupled to at least one of the one or more quantum signal generators 530 at the input end 561 of the optical fiber link 560 and optically coupled to at least one of the one or more quantum signal receivers 540 at the output end 563 of the optical fiber link 560. Further, the second core 562b of the optical fiber link 560 may be optically coupled to at least one of the one or more classical signal generators 531 at the input end 561 of the optical fiber link 560 and optically coupled to at least one of the one or more classical signal receivers 541 at the output end 563 of the optical fiber link 560. In operation, the first core 562a may provide an optical pathway for one or more quantum photon signals traversing the optical fiber link 560 between the input end 561 and the output end 563 and the second core 562b may provide an optical pathway for classical photon signals traversing the optical fiber link 560 between the input end 561 and the output end 563.

In some embodiments, when the optical fiber link 560 comprises two or more cores 562, the ratio of cores 562 used as quantum channels (e.g., cores optically coupled to the one or more quantum signal generators 530) and the number of cores 562 used as classical channels (e.g., cores optically coupled to the one or more classical signal generators 531) may be 1:1, 1:2, 1:4, 1:6, 1:8, or the like. It should be understood that any number of cores 562 may be used as quantum channels and any number of cores 562 may be used as classical channels. Alternatively, the one or more quantum signal generators 530 and the one or more classical signal generators 531 may be optically coupled to the same core, for example, the first core 562a or the second core 562b, such that the quantum photon signal and the classical photon signal traverse the same core 562.

In operation, reducing spontaneous Raman scattering (SpRS) and crosstalk (e.g., linear spatial crosstalk) between the classical photon signals and the quantum photon signals traversing the optical fiber link 560 may reduce optical attenuation of the quantum photon signals traversing the optical fiber link 560. Reducing SpRS and crosstalk may also reduce false quantum photon signal detections at the one or more quantum signal receivers 540 caused by SpRS and crosstalk noise. Further, SpRS noise generated by the classical photon signals, which have a higher optical power than the quantum photon signals, may be captured by the quantum photon signals, increasing the noise in the quantum photon signals. By reducing SpRS and crosstalk and thereby reducing optical attenuation and noise, the length of the optical fiber link 560 may be increased. For example, the length of the optical fiber link 560 may be between about 10 km and about 1000 km, for example, 50 km, 70 km, 80 km, 90 km, 100 km, 200 km, 300 km, 400 km, 500 km, 600 km, 700 km, 800 km, 900 km, or the like. Moreover, the embodiments described herein allow one or more quantum photon signals and one or more classical photon signals comprising telecom wavelengths (e.g., about 1550 nm) to simultaneously traverse the optical fiber link 560 at a bit rate of about 100 Gb/s or more over a fiber length greater than 70 km, such as 100 km.

As stated in the non-limiting examples above, the first core 562a may provide an optical pathway for the quantum photon signals and the second core 562b may provide an optical pathway for the classical photon signals. The first core 562a and the second core 562b may comprise dissimilar core designs to reduce the SpRS and crosstalk between the quantum photon signal traversing the first core 562a and the classical photon signal traversing the second core 562b. For example, the first core 562a and the second core 562b may comprise different core deltas and/or different core radii, each of which may reduce or eliminate the phase matching condition between the first core 562a and the second core 562b to reduce the mode coupling effect between the first core 562a and the second core 562b, thereby reducing crosstalk. For example, the core delta between the first core 562a and the second core 562b may be about 0.0001 and about 0.001, for example, about 0.0003, 0.0005, 0.0007, 0.0009, or the like. Further, the first core 562a may comprise a first core radius, the second core may comprise a second core radius and the first core radius may be different than the second core radius.

Further, the index profile design of the first core 562a and the second core 562b may reduce the SpRS and crosstalk between the quantum and classical photon signals traversing the optical fiber link 560. For example, one or both of the first core 562a and the second core 562b may comprise a trench index profile (e.g., using one or more trench rings 567 described below), a step index profile, a graded index profile, a parabolic index profiles, a triangular index profile, the like. Further, the first core 562a and the second core 562b may comprise differing effective refractive indices, which may also reduce crosstalk therebetween. The effective refractive indices of the first core 562a and the second core 562b may differ by between about 0.0001 and about 0.001, such as about 0.0003, 0.0005, 0.0007, 0.0009, or the like. For example, the first core 562a may comprise a first effective refractive index, the second core 562b may comprise a second effective refractive index, and the first effective refractive index may be different than the second effective refractive index. Moreover, the material of the optical fiber link 560 may alter the SpRS and crosstalk of classical and quantum photon signals traversing the optical fiber link 560. An example optical fiber link 560 comprising pure silica may cause about 10% less SpRS between quantum and classical photon signals traversing the optical fiber link 560 than another example optical fiber link 560 comprising Ge doped silica.

In operation, crosstalk between the first core 562a and the second core 562b may depend on the index profile design of each core 562a, 562b, core spacing (e.g., the distance between each core 562a, 562b), the correlation length, and the propagation distance (e.g., length of the optical fiber link 560). For example, the crosstalk between the first core 562a and the second core 562b may be mathematically represented by the following equation: $X=2\kappa^2 L L_C$ where X is the crosstalk, $\kappa$ is the coupling coefficient, $L_C$ is the correlation length, and L is the length of the optical fiber link 560. In some embodiments, the optical fiber link 560 may comprise a crosstalk X that is less than about −20 dB, for example, less than about −30 dB. By reducing crosstalk, additional classical photon signals may traverse the optical fiber link 560 without attenuating the quantum photon signals. As one non-limiting example of the optical fiber link 560, when the correlation length is 10 mm, the fiber length is 100 km, core spacing is greater than 45 μm, the effective area is 80 μm$^2$ and the optical fiber link 560 has a step index profile design, the crosstalk may be less than about −30 dB after 100 km signal propagation. The core spacing of this example optical fiber link 560 may be reduced to about 37 μm without increasing crosstalk if the example optical fiber link 560 comprises a trench profile design. Moreover, the core spacing may also be reduced if the effective area of the optical fiber link 560 is increased.

Further, as depicted in FIG. 7, the optical fiber link 560 may also include one or more trench rings 567 that comprise a refractive index that is different than the refractive index of the cladding 565. The trench rings 567 may be positioned within the cladding 565 and may extend between the input end 561 and the output end 563 of the optical fiber link 560. Further, each individual trench ring 567 may encircle individual cores 562, for example, a first trench ring 567a may encircle the first core 562a and a second trench ring 567b may encircle the second core 562b. In operation, the one or more trench rings 567 may reduce crosstalk between the quantum photon signals and the classical photon signals traversing the optical fiber link 560. Moreover, the trench rings 567 may reduce the power in the cladding 565 by reducing the overlap between the electric fields generated by the quantum photon signals traversing the first core 562a and the classical photon signals traversing the second core 562b, allowing the first core 562a and the second core 562b to be positioned closer together without increasing crosstalk. For example, by encircling the first core 562a, the second core 562b, or both, with the one or more trench rings 567, the core spacing between the first core 562a and the second core 562b may be reduced without increasing crosstalk.

Referring again to FIG. 6, the one or more optical multiplexers 502 and the one or more optical demultiplexers 504 may be positioned in the signal linking system 501 and may be used to multiplex the classical photon signals and the quantum photon signals to reduce the SpRS between the classical and quantum photon signals traversing the optical fiber link 560. Further, the one or more optical encoders 506 and the one or more optical decoders 508 may also be positioned in the signal linking system 501 and may be used to encode and decode the classical photon signals and quantum photon signals, which may also reduce the SpRS between the classical photon signals and quantum photon signals.

As depicted in FIG. 6, the one or more optical multiplexers 502 may be positioned between and optically coupled to the one or more cores 562 of the optical fiber link 560 at the input end 561 of the optical fiber link 560 and each of the one or more quantum signal generators 530 and the one or more classical signal generators 531. While one optical multiplexer 502 is depicted in FIG. 6, it should be understood that any number of optical multiplexers 502 are contemplated. The one or more optical multiplexers 502 may each comprise any known or yet-to-be developed multiplexer configured to multiplex optical signals, for example, the quantum photon signal and the classical photon signal. For example, the one or more optical multiplexers 502 may comprise one or more of a wavelength-division multiplexer, polarization-division multiplexer, time-division multiplexer, a frequency-division multiplexer, or the like.

Moreover, each of the one or more optical multiplexers 502 may be configured to perform multiple multiplexing operations, for example, wavelength-division multiplexing, polarization-division multiplexing, time-division multiplexing, frequency-division multiplexing, or combinations thereof. In operation, multiplexing the quantum and classical photon signals may reduce the crosstalk and the SpRS between the quantum and classical photon signals as they traverse the one or more cores 562 of the optical fiber link 560 and allow the quantum and classical photon signals to simultaneously traverse the same core 562 of the optical fiber link 560.

As one non-limiting example, wavelength-division multiplexing can be used to accommodate multiple quantum and/or classical photon signals on a single core 562, for example, simultaneously. Each quantum photon signal may be wavelength-division multiplexed such that the wavelength spacing between the quantum and/or classical photon signals traversing the optical fiber link is between about 1 nm and about 10 nm, for example, 2 nm, 4 nm, 5 nm, 8 nm, or the like. Wavelength spacing the quantum and/or classical photon signals may reduce crosstalk between the quantum and the classical photon signals, between individual quantum photon signals, and/or between individual classical photon signals. As another example, frequency-division multiplexing may be used to accommodate multiple quantum and/or classical photon signals on a single core 562, for example, simultaneously, such that each quantum and/or classical photon signal comprises a different frequency bands. Further, time-division multiplexing may be used to accommodate multiple quantum and/or classical photon signals on a single core 562 such that each quantum and/or classical photon signal traverse the optical fiber link 560 in a time staggered pattern. Time-division multiplexing may allow an increased number of classical photon signals and quantum photon signals to traverse the optical fiber link 560 without an increase in SpRS and crosstalk.

Moreover, the one or more optical multiplexers 502 may also polarization-division multiplex multiple quantum and/or classical photon signals on a single core 562, for example, simultaneously, such that each quantum and/or classical photon signal comprises different polarization states. For example, the one or more optical multiplexers 502 may polarization multiplex the classical photon signals using a coherent modulation format, for example, a modulation format that uses the phase information of the photon signal (e.g., the classical photon signal) in the modulation process. Example coherent modulation formats include a polarization-multiplexed quadrature amplitude modulation based on sixteen signal points (PM-16QAM) coherent modulation format, a polarization-multiplexed quadrature amplitude modulation based on eight signal points (PM-8QAM) coherent modulation format, a polarization-multiplexed phase shift-keying based on four signal points (PM-QPSK) coherent modulation format, a polarization-multiplexed phase shift-keying based on two signal points (PM-BPSK) coherent modulation format, a polarization-switched phase shift-keying (PS-QPSK) coherent modulation format, or any known or yet-to-be developed coherent modulation format or other modulation format for polarization multiplexing. Moreover, in some embodiments, the classical photon signals may be modulated using a modulator optically coupled to the one or more multiplexers 502 or, as stated above, the one or more multiplexers may modulate and multiplex the classical photon signals. In some embodiments, the one or more optical multiplexers 502 may multiplex the quantum photon signal and the classical photon signal using wavelength-division multiplexing, time-division multiplexing, frequency-division multiplexing, or a combination thereof, and may polarization-division multiplex the classical photon signal, for example, using the above coherent modulation formats.

In operation, while less SpRS is generated by a single classical photon signal than by multiple classical photon signals, the optical signal-to-noise ratio (OSNR) penalty (e.g., increase in noise) caused by the PM-16QAM may outweigh the benefit of lowering the SpRS. Thus, the PM-16QAM coherent modulation format may be preferred when a single classical photon signal traverses the one or more optical multiplexers 502 and the PM-QPSK coherent modulation format may be preferred when two or more classical photon signals traverse the one or more optical multiplexers 502. Moreover, the PM-QPSK coherent modulation format and the PM-BPSK coherent modulation formats may have the same signal capacity and the same noise generation, (e.g., noise generated by both OSNR and the SpRS) and the PM-BPSK coherent modulation format may facilitate twice the number of photon signals as the PM-QPSK coherent modulation format. Thus, the PM-QPSK coherent modulation format may be preferred when between about 1 and about 2 classical photon signals traverse the optical multiplexer 502 and the PM-BPSK coherent modulation format may be preferred when a greater number of classical photon signals, for example, between about about 2 and about 4 classical photon signals, or more, traverse the optical multiplexer 502.

As depicted in FIG. 6, the one or more optical demultiplexers 504 may be positioned between and optically coupled to the at least one core 562 of the optical fiber link 560 at the output end 563 of the optical fiber link 560 and each of the one or more quantum signal receivers 540 and the one or more classical signal receivers 541. The one or more optical demultiplexers 504 may comprise any known or yet-to-be developed demultiplexer configured to demultiplex optical signals. The optical demultiplexer 504 may be a wavelength-division demultiplexer, polarization-division demultiplexer, time-division demultiplexer, frequency-division demultiplexer, or the like. Further, the optical demultiplexer 504 may be structurally configured to polarization demultiplex and demodulate the quantum and classical photon signals, for example, demodulate the PM-16QAM coherent modulation format, the PM-8QAM coherent modulation format, the PM-QPSK coherent modulation format, the PM-BPSK coherent modulation format, the PS-QPSK coherent modulation format, or any known or yet to be developed coherent demodulation format for polarization demultiplexing. Moreover, in some embodiments, the classical photon signals may be demodulated using a demodulator optically coupled to the one or more demultiplexers 504 or, as stated above, the one or more demultiplexers 504 may demodulate and demultiplex the classical photon signals.

In operation, upon receipt of the multiplexed quantum and classical photon signals from the one or more cores 562 of the optical fiber link 560, the one or more optical demultiplexers 504 may demultiplex the multiplexed quantum and classical photon signals and output both the quantum and classical photon signals. After demultiplexing the quantum and classical photon signals, the one or more optical demultiplexers 504 may output the quantum photon signal toward the quantum signal receiver 540 and may output the classical photon signal towards the classical signal receiver 541, for example, along one or more optical fibers, optical waveguides, or the like.

Referring again to FIG. 6, the one or more optical encoders 506 may be positioned between and optically coupled to the one or more cores 562 of the optical fiber link 560 at the input end 561 of the optical fiber link 560 and each of the one or more quantum signal generators 530 and the one or more classical signal generators 531. Further, the one or more optical encoders 506 may also be optically coupled to the one or more optical multiplexers 502, for example, positioned between the one or more optical multiplexers 502 and each of the one or more quantum signal generators 530 and the one or more classical signal generators 531, as depicted in FIG. 6, or alternatively, positioned between the one or more optical multiplexers 502 and the input end 561 of the optical fiber link 560.

The one or more optical encoders 506 may comprise one or more electronic devices such as integrated circuits, interferometers, or the like, structurally configured to encode the quantum and classical photon signals, for example, using hard decision forward error correction (FEC), soft decision FEC, polarization encoding, phase discrimination, time-binning, or the like. In particular, the quantum photon signals may be encoded using polarization encoding, phase discrimination, time binning, or any other known or yet-to-be developed quantum encoding methods, for example, as described in Sangouard et. al., "Quantum repeaters based on atomic ensembles and linear optics," Review of Modern Physics, Vol. 83, 2011, pgs 34-73. Further, the classical photon signals may be encoded using hard decision FEC and/or soft decision FEC. Encoding the classical photon signals using FEC enables the signal power of the classical photon signals to be decreased, which decreases the SpRS and crosstalk between the classical and quantum photon signals, allowing an increase in the length of the optical fiber link 560. Moreover, in embodiments in which the optical multiplexer 502 is structurally configured to polarization multiplex the quantum and classical photon channels, the one or more optical encoders 506 may encode the quantum photon signals by time binning the quantum photon channels. Time binning the quantum photon signals does not alter the polarization state of the quantum photon signals, allowing the quantum photon signals to be polarization multiplexed.

As also depicted in FIG. 6, the one or more optical decoders 508 may be positioned between and optically coupled to the one or more cores 562 of the optical fiber link 560 at the output end 563 of the optical fiber link 560 and each of the quantum signal receiver 540 and the classical signal receiver 541. Further, the one or more optical decoders 508 may also be optically coupled to the one or more optical demultiplexers 504, for example, positioned between the one or more optical demultiplexers 504 and each of the one or more quantum signal receivers 540 and the one or more classical signal receivers 541, as depicted in FIG. 6, or alternatively, positioned between the one or more optical demultiplexers 504 at the output end 563 of the optical fiber link 560. The optical decoder 508 may comprise any electronic device structurally configured to decode the quantum and classical photon signals encoded by the optical encoder 506, for example, using hard decision FEC soft decision FEC, polarization decoding, phase discrimination, time binning, or the like.

In operation, the polarization multiplexing and demultiplexing coherent modulation formats of the one or more optical multiplexers 502 and the one or more optical demultiplexers 504, described above, may be used alone or in combination with the optical encoding and decoding processes of the one or more optical encoders 506 and the one or more optical decoders 508 to reduce SpRS between the quantum and classical photon signals traversing the optical fiber link 560. For example, for classical photon signals, the PM-16QAM coherent modulation format, the PM-8QAM coherent modulation format the PM-QPSK coherent modulation format, the PM-BPSK coherent modulation format, or the PS-QPSK coherent modulation format of the one or more optical multiplexers 502 and the one or more optical demultiplexers 504 may be used in combination with hard or soft decision FEC, which may provide isolation between the quantum and classical photon signals traversing the optical fiber link 560 of greater than about −40 dB, for example, between about −40 dB and about −80 dB, for example, −45 dB, −50 dB, −55 dB, −60 dB, −64 dB, −70 dB, −75 dB, or the like. This increased isolation may decrease the SpRS and crosstalk between the quantum and classical photon signals, allowing longer optical fiber links 560 to be used in the signal linking system 501.

Further, while polarization multiplexing is described in combination with FEC processes, it should be understood that FEC processes may be used with any multiplexing method described above to reduce the SpRS between the classical and quantum photon signals traversing the optical fiber link 560. For example, wavelength division multiplexing, frequency division multiplexing, and time division multiplexing may be used in combination the FEC processes of the optical encoder 506 and optical decoder 508.

Referring again to FIG. 7, while the one or more optical multiplexers 502 and the one or more optical demultiplexers 504 are described above as optically coupled to a single core 562, in other embodiments, the one or more optical multiplexers 502 and the one or more optical demultiplexers 504 are optically coupled to multiple cores, for example, both the first core 562a and the second core 562b. For example, at least one of the one or more optical multiplexers 502 may be optically coupled to the first core 562a such that the quantum signals generated by the quantum signal generator 530 and multiplexed with the classical photon signal using the one or more optical multiplexers 502, traverse the first core 562a.

Further, at least one of the optical multiplexers 502 may be optically coupled with the second core 562b such that the classical photon signals generated by the classical signal generator 531 multiplexed, for example, with the quantum photon signal using at least one of the one or more optical multiplexers 502, traverse the second core 562b.

Referring again to FIGS. 6 and 7, a method of multiplexing and demultiplexing a quantum photon signal and a classical photon signal is contemplated. While described below in a particular order, it should be understood that other orders are contemplated. The method may comprise emitting a quantum photon signal from the one or more quantum signal generators 530 and emitting a classical photon signal having a higher optical power than the quantum photon signal from the one or more classical signal generators 531 such that the classical photon signal and the quantum photon signal irradiate the optical multiplexer 502. In some embodiments, before irradiating the one or more optical multiplexers 502, the quantum photon signal may be encoded by the one or more optical encoders 506, for example, using polarization encoding, phase discrimination, time binning, or the like and the classical photon signal may be encoded by the one or more optical encoders 506, for example, using hard decision FEC, soft decision FEC, or the like. Upon receipt of the classical photon signal and the quantum photon signal by the one or more optical multiplexers 502, the one or more optical multiplexers 502 multiplex the classical photon signal and the quantum photon signal, for example, using wavelength-division multiplexing, time-division multiplexing, frequency multiplexing, or combinations thereof. Further, upon receipt of the classical photon signal, the one or more optical multiplexers 502 polarization multiplexes the classical photon signal, for example, using the PM-16QAM coherent modulation format, the PM-8QAM coherent modulation format, the coherent PM-QPSK modulation format, the PM-BPSK coherent modulation format, or the PS-QPSK coherent modulation format.

Next, the one or more optical multiplexers 502 output the multiplexed classical photon signal and the multiplexed quantum photon signal, which each enter the one or more cores 562 of the optical fiber link 560 at the input end 561 of the optical fiber link 560 such that the multiplexed classical and quantum photon signals traverse the core 562 of the optical fiber link 560 from the input end 561 to the output end 563, and irradiate the optical demultiplexer 504. Upon receipt of the multiplexed classical and quantum photon signals, the one or more optical demultiplexers 508 demultiplex the multiplexed quantum photon signal and the multiplexed classical photon signal, output the quantum photon signal towards the quantum signal receiver 540, and output the classical photon signal towards the classical signal receiver 541. In some embodiments, before reaching the quantum signal receiver 540 and the classical signal receiver 541, the classical photon signal and the quantum photon signal may be decoded by the one or more optical decoders 508.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A quantum key generation system comprising: two photon detector units; and two photon entanglement chains, wherein:

each photon entanglement chain extends between the two photon detector units;

each photon entanglement chain comprises an originating entangled photon generator, first and second intermediate entangled photon generators, first and second intermediate quantum repeaters, and first and second terminating quantum memories;

the first and second terminating quantum memories are positioned at first and second ends of the photon entanglement chains, respectively;

the originating entangled photon generators are positioned at respective origination locations between the first and second ends of the photon entanglement chains;

the first and second intermediate quantum repeaters of each photon entanglement chain are optically coupled to the originating entangled photon generator of the photon entanglement chains by optical fiber links of core length L;

the first and second intermediate entangled photon generators of each photon entanglement chain are optically coupled to the first and second intermediate quantum repeaters, respectively, of the photon entanglement chains by optical fiber links of core length L;

the first and second intermediate entangled photon generators of each photon entanglement chain are optically coupled to the first and the second terminating quantum memories, respectively, of the photon entanglement chains by optical fiber links of core length L', where L'>L;

the originating entangled photon generators, the first intermediate entangled photon generators, and the second intermediate entangled photon generators are each structurally configured to generate an entangled pair of photons;

the first and second intermediate quantum repeaters of each photon entanglement chain are structurally configured such that an entangled pair of photons generated by the originating entangled photon generator are entangled with an entangled pair of photons generated by the first and second intermediate entangled photon generators, respectively;

the first and second terminating quantum memories of each of the two photon entanglement chains form first and second cross-chain quantum repeaters, respectively, to generate measurable entangled particles at the cross-chain quantum repeaters; and the two photon detector units are first and the second photon detector units and are structurally configured to receive the measurable entangled particles generated by the first and second cross-chain quantum repeaters, respectively.

2. The quantum key generation system as claimed in claim 1, wherein the photon detector units comprise one or more single-photon detectors.

3. The quantum key generation system as claimed in claim 1, wherein each photon detector unit of said two photon detector units comprises a pair of photon detectors positioned in optical alignment with the terminating quantum memories such that a particle generated an individual terminating quantum memory is received by an individual photon detector.

4. The quantum key generation system as claimed in claim 1, wherein the first and second intermediate quantum repeaters of each photon entanglement chain are structurally configured to (i) receive an individual entangled photon generated by one of the originating entangled photon generators, (ii) receive an individual entangled photon generated by the first and second intermediate entangled photon generators of one of the photon entanglement chains, respectively, and (iii) entangle the received photons.

5. The quantum key generation system as claimed in claim 1, wherein:
the first and second intermediate quantum repeaters of each photon entanglement chain each comprise two quantum memories and entanglement optics; and
the entanglement optics comprise two entangling pathways optically coupled to and extending between the two quantum memories and two entanglement detectors.

6. The quantum key generation system as claimed in claim 5 wherein:
the entanglement optics further comprise a beamsplitter positioned such that each entangling pathway traverses the beamsplitter; and
the entanglement optics are structurally configured to entangle pairs of particles when particles output by the quantum memories simultaneously traverse the beamsplitter.

7. The quantum key generation system as claimed in claim 1 wherein:
the first and second intermediate quantum repeaters of each photon entanglement chain each comprise entanglement optics comprising two entangling pathways optically coupled to two entanglement detectors; and
a beamsplitter positioned such that each entangling pathway traverses the beamsplitter.

8. The quantum key generation system as claimed in claim 7, wherein the entanglement optics are structurally configured to entangle pairs of particles when particles received by the first and second intermediate quantum repeaters simultaneously traverse the beamsplitter.

9. The quantum key generation system as claimed in claim 1 wherein the first and second cross-chain quantum repeaters are structurally configured to (i) receive photons generated by the first and the second intermediate entangled photon generators of each photon entanglement chain, respectively, (ii) entangle the received photons such that an entangled pair of photons generated by the first and second intermediate entangled photon generators of each photon entanglement chain are entangled, and (iii) generate a measurable entangled particle.

10. The quantum key generation system as claimed in claim 1 wherein the first and second cross-chain quantum repeaters of each photon entanglement chain further comprise terminating entanglement optics comprising one or more entangling pathways optically coupled to and extending between the terminating quantum memories and the photon detector units.

11. The quantum key generation system as claimed in claim 10 wherein:
the terminating entanglement optics further comprise a beamsplitter positioned such that each entangling pathway traverses the beamsplitter; and
the terminating entanglement optics are structurally configured to entangle pairs of particles when particles output by the terminating quantum memories simultaneously traverse the beamsplitter.

12. The quantum key generation system as claimed in claim 1 wherein:
the optical fiber links comprise multicore optical fiber links; and
the multicore optical fiber links each comprise at least two non-uniform cores structurally configured to provide non-uniform photon propagation delay.

13. The quantum key generation system as claimed in claim 1 further comprising additional quantum repeaters and additional entangled photon generators positioned between the originating location and the first end and positioned between the originating location and the second end.

14. The quantum key generation system as claimed in claim 13 wherein the additional quantum repeaters and the additional entangled photon generators are alternately disposed such that:
each additional quantum repeater is disposed between and optically coupled to adjacent entangled photon generators using optical fiber links; and
each additional entangled photon generator is disposed between and optically coupled to an additional quantum repeater and one of another additional quantum repeater or an individual terminating quantum memory using optical fiber links.

15. The quantum key generation system as claimed in claim 14 wherein the optical fiber links that are optically coupled to additional quantum repeaters positioned increasingly outward from the origination location comprise increasingly lengthened core lengths.

16. The quantum key generation system as claimed in claim 15 wherein the optical fiber links that are optically coupled to the terminating quantum memories comprise the longest core length of the plurality of optical fiber links.

17. The quantum key generation system as claimed in claim 15 wherein the optical fiber links that are optically coupled to the first and second intermediate quantum repeaters have the shortest core length of the plurality of optical fiber links.

18. The quantum key generation system according to claim 1, wherein:
the two photon entanglement chains are structurally configured to generate correlative quantum key bits receivable by each photon detector unit at a bit rate of between about 1-100 MHz.

19. The quantum key generation system according to claim 1, wherein:
the two photon entanglement chains are structurally configured to generate correlative quantum key bits receivable by each photon detector unit at a bit rate $\Gamma$ that is within about 10% of a processing rate $\Pi$ of the at least one quantum repeater.

20. A quantum key generation system comprising two photon detector units and two photon entanglement chains wherein:
each photon entanglement chain extends between the two photon detector units;
each photon entanglement chain comprises an originating entangled photon generator, first and second intermediate entangled photon generators, first and second intermediate quantum repeaters, and first and second cross-chain quantum repeaters;
the first and second cross-chain quantum repeaters are positioned at first and second ends of the photon entanglement chains, respectively;
the originating entangled photon generators are positioned at respective origination locations between the first and second ends of the photon entanglement chains;
the first and second intermediate quantum repeaters of each photon entanglement chain are optically coupled to the originating entangled photon generator of the photon entanglement chains by optical fiber links of core length L;
the first and second intermediate entangled photon generators of each photon entanglement chain are optically coupled to the first and second intermediate quantum repeaters, respectively, of the photon entanglement chains by optical fiber links of core length L;
the first and second intermediate entangled photon generators of each photon entanglement chain are optically coupled to the first and the second cross chain quantum repeaters, respectively, of the photon entanglement chains by optical fiber links of core length L', where L'>L;
the originating entangled photon generators, the first intermediate entangled photon generators, and the second intermediate entangled photon generators are each structurally configured to generate an entangled pair of photons;
the first and second intermediate quantum repeaters of each photon entanglement chain are structurally configured such that an entangled pair of photons generated by the originating entangled photon generator are entangled with an entangled pair of photons generated by the first and second intermediate entangled photon generators, respectively;
the first and second cross-chain quantum repeaters are structurally configured to receive and entangle photons from each photon entanglement chain and generate measurable entangled particles; and
the first and the second photon detector units are structurally configured to receive the measurable entangled particles generated by the first and second cross-chain quantum repeaters, respectively.

* * * * *

UNITED STATES PATENT AND TRADEMARK OFFICE
CERTIFICATE OF CORRECTION

PATENT NO. : 10,361,848 B2
APPLICATION NO. : 15/438155
DATED : July 23, 2019
INVENTOR(S) : Stuart Gray et al.

Page 1 of 1

It is certified that error appears in the above-identified patent and that said Letters Patent is hereby corrected as shown below:

On the Title Page

On page 2, Column 2, item (56), other publications, Line 39, delete "entangelment" and insert -- entanglement --, therefor.

Signed and Sealed this
Thirty-first Day of December, 2019

Andrei Iancu
*Director of the United States Patent and Trademark Office*